(12) United States Patent
Greene et al.

(10) Patent No.: US 6,680,761 B1
(45) Date of Patent: *Jan. 20, 2004

(54) TILED FLAT-PANEL DISPLAY HAVING VISUALLY IMPERCEPTIBLE SEAMS, OPTIMIZED FOR HDTV APPLICATIONS

(75) Inventors: Raymond G. Greene, Ovid, NY (US); Donald P. Seraphim, Vestal, NY (US); Dean W. Skinner, Vestal, NY (US); Boris Yost, Ithaca, NY (US)

(73) Assignee: Rainbow Displays, Inc., Endicott, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/490,776

(22) Filed: Jan. 24, 2000

(51) Int. Cl.[7] .......................... G02F 1/133; G02F 1/1339
(52) U.S. Cl. ......................................... 349/73; 349/153
(58) Field of Search .................................... 349/73, 153

(56) References Cited

U.S. PATENT DOCUMENTS

| | | | | |
|---|---|---|---|---|
| 5,661,531 A | * | 8/1997 | Greene et al. | 349/73 |
| 5,903,328 A | * | 5/1999 | Greene et al. | 349/73 |
| 6,055,030 A | * | 4/2000 | Izumi | 349/73 |
| 6,097,455 A | * | 8/2000 | Babuka et al. | 349/73 |
| 6,124,917 A | * | 9/2000 | Fujioka et al. | 349/153 |
| 2001/0046007 A1 | * | 11/2001 | Greene et al. | 349/73 |

* cited by examiner

Primary Examiner—Julie Ngo
(74) Attorney, Agent, or Firm—Salzman & Levy; David Banner

(57) ABSTRACT

The present invention features designs of pixels and designs of control features for seals on AMLCD tiles optimized for tiling AMLCD flat panel displays (FPDs) which have visually imperceptible seams. The FPD structure has an image view plane which is continuous and remote from the pixel apertures or image source plane on the inside of the tiles. The image is formed on the view plane by a distributed ultra low magnification flies-eye optical system (a screen) that is integrated with the tiles, effectively excluding and obscuring an image of the seams. The innovations described herein minimize the defects on the perimeter pixels by effectively damming the waviness of the front of the seal near the perimeter pixels on the tiles. Dark space required for the seal between the interior tile edges and active regions of the pixels is decreased, as is the space allocated for wiring thereby increasing the feasible aperture ratios near the mosaic edges and all apertures. The tile designs make effective use of the area of an entire manufacturing panel.

22 Claims, 18 Drawing Sheets

T = row (gate) control line
R,G,B = Column (drain) data signal for red, green, and blue C = Ccom
T = row (gate) control line
R,G,B = Column (drain) data signal for red, green, and blue

TILED FLAT-PANEL DISPLAY HAVING VISUALLY IMPERCEPTIBLE SEAMS, OPTIMIZED FOR HDTV APPLICATIONS

RELATED PATENT APPLICATIONS

The present application is related to U.S. Pat. Nos. 5,661,531 granted Aug. 26, 1997, U.S. Pat. No. 5,867,236 granted Feb. 22, 1999, U.S. Pat. No. 5,889,568 granted Mar. 30, 1999 for TILED FLAT PANEL DISPLAYS, and U.S. patent applications Ser. No. 09/322,047 filed May 28, 1999, issued as U.S. Pat. No. 6,133,969, U.S. Ser. No. 09/368,921 filed Aug. 16, 1999, and U.S. Ser. No. 09/024,481 filed Feb. 17, 1998, now issued as U.S. Pat. No. 6,152,580, assigned to the common assignee, and hereby incorporated by reference.

FIELD OF THE INVENTION

The invention pertains to flat-panel electronic displays and, more particularly, to large, flat-panel electronic displays that are composed of a plurality of joined, smaller building blocks (tiles) having seams therebetween. The tiles may be viewed as though they were a single, monolithic display (i.e., as a display having visually imperceptible seams).

BACKGROUND OF THE INVENTION

Images on electronic displays are derived from an array of small picture elements known as pixels. In color displays, these pixels comprise three color elements that produce the primary colors: red, blue and green (R, B and G), for example. Usually arranged in rectangular arrays, these pixels can be characterized by a pixel pitch, P, a quantity that measures the spacing of pixels in one direction. A typical cathode-ray tube (CRT) display used for computer applications has a pixel pitch of 0.3 mm and a pixel array width:height ratio of 4:3. Typical standardized arrays in computer displays are comprised of 640×480 video graphics array (VGA) or 800×600 pixels super video graphics array (SVGA), 1024×768 extended graphics array (XGA) and new standards are being generated with 16/9 ratios, wide screen format, such as standard definition television (SDTV) 852×480 and high definition television (HDTV) 1280×720.

Large displays can be constructed of a plurality of adjacent tiles, with each having a single pixel or an array thereof. Such assembled tiled displays contain visually disturbing seams, resulting from the gaps between adjacent pixels on the same and/or adjacent tiles. Such seams may incorporate interconnect, adhesives seals, mechanical alignment means and other components resulting in visible optical discontinuities in displayed images. Some of these structures are described in the aforementioned U.S. Pat. No. 5,661,531. As a consequence, the image portrayed on seamed displays appears segmented and disjointed. Therefore, it is desirable to fabricate tiled, flat-panel displays which do not have noticeable or perceptible seams under the intended viewing conditions.

The pixel pitch in electronic displays must be set so that a continuous image is produced when the display is viewed at distances greater than the minimum viewing distance. For example, with a pixel pitch of P=0.3 mm, the minimum viewing distance is on the order of 1 m. Even though the minimum viewing distance increases in proportion to the pixel pitch, it still limits the pixel pitch for most computer and consumer displays. Since space for the tiling functions must be provided in areas within the pixel pitch but smaller in size than the pixel pitch, it is difficult to develop structures and methods for constructing tiled visually seamless displays.

Flat-panel displays (FPD) provide the best choice for constructing "seamless", tiled screens. Flat-panel displays include backlighted and self-lighted displays. Liquid crystal displays (LCDs) are the most common backlighted displays.

Flat-panel displays depend on the microfabrication of key components that carry the pixel patterns. Unfortunately, microfabrication techniques are not viable for very large displays currently greater than 20 inches diagonal, due to the fact that manufacturing yield declines rapidly with increasing area of the display. Furthermore handling and filling the largest Active Matrix Liquid Crystal Display (AMLCD) displays with liquid crystal increases yield losses. Therefore, the inventors have determined that tiles with arrays of pixels can be microfabricated and then assembled together to form a larger electronic display.

The present invention provides unique designs and methods for achieving such large, seamless, tiled panels for color or gray-scale displays. This invention particularly focuses on displays of the transparent, lightvalve type. In such displays, light from a uniform, backlight source is transmitted through the display assembly and directly viewed from the front side of the display. The lightvalves control the amount of primary light rays transmitted through each of the color elements in the pixels. At a sufficient viewing distance, the viewer's eyes merge the primary light from the pixels to form a continuous image. Because of a number of secondary processes, low-level light emanates from the spaces between the pixels. These phenomena include reflection and light guiding, all of which must be kept to a minimum in order to achieve sufficient brightness and contrast. The spaces between pixels on the same tile, and the spaces between pixels on adjacent tiles have different structures. Consequently, the presence of seams between the pixels at the edge of the tiles affects both primary and secondary light rays, thus increasing the difficulties for constructing seamless, tiled displays.

The inventors have identified three design principles in making large-scale, seamless, flat panels that may be viewed as though they were single monolithic displays: (a) the intra-tile pixel pitch on the view plane for the tiles must be substantially matched to the inter-tile pixel pitch; (b) the primary light paths through the lightvalves must not be affected by the presence of the seam or any other structures or components used in the tile assembly; (c) the inter-pixel regions must be designed so that intra-tile and inter-tile pixel regions, which have different physical structures, present approximately the same visual appearance to the viewer under transmitted and reflected light. This has largely been accomplished by applying the technology described in U.S. Pat. No. 5,661,531 to fabricated tiled AMLCD functional models. These functional prototype models of a 2×2 array of AMLCD tiles are SVGA FPDs with 38.6 diagonal view areas that have monolithic seamless appearance in static and video modes. However, design improvements in this patent disclosure will increase manufacturing yields and maximize optical performance for SDTV and HDTV application of the tiled displays and their component parts, particularly the tiles. It is also possible with this invention to build dual usage displays such as a display that can provide either HDTV or XGA formats.

SUMMARY OF THE INVENTION

The present invention describes a tiled, flat-panel display having visually imperceptible seams between tiles disposed in an interior portion thereof, so that the display is perceived by a human observer as a single, monolithic display, when viewed at a distance equal or greater than the intended minimum viewing distance. This invention applies primarily to lightvalve-type, flat-panel displays with a backlight.

The panel comprises an image source plane having spaced-apart pixels with active areas which control the primary-color, light-transmitting elements (e.g., red, blue and green). It should be understood that the primary colors need not be red, blue and green but may be other colors, and not necessarily limited to three. Included in the image source plane may be a color filter (CF) layer. Alternatively, the CF may be included with screen and polarizer outside of the tiles continuous across the mosaic. Surrounding the active area of each pixel is an inactive (dark) area. This dark area can be used for a variety of purposes without affecting the light output and/or visual appearance of the display. For example, electrical circuitry, such as transistors, are situated in the dark spaces. Most importantly, thin, perimeter seals at the edges of the AMLCD tiles may utilize that portion on the dark areas of the pixels adjacent to the edge. Wiring may also be placed in the pixel dark areas, as required.

Each of the pixels is disposed along the image source plane at a given pitch greater than approximately 0.2 mm and preferably in a range of 0.7 to 1.0 mm, depending upon the size of the display and the pixel density desired. An image source plane is defined by the plurality of adjacently-disposed tiles. The invention includes a number of methods for the design, construction and assembly of tiled displays with invisible seams which are significant compliments to the technique disclosed in U.S. Pat. No. 5,661,531 etc. These can be grouped into the following distinct categories: (1) alteration of the characteristics of the image source plane, (2) preferred positioning and design of the masks, polarizer and image view plane (screen) to enhance hiding of the seams between tiles, (3) optimizing the pixel design, the seal control factors, the row and column wiring, (4) enhancement of the brightness of the display assembly by optimizing the backlight collimation angles, (5) enhancement of the brightness and contrast of the display assembly by optimizing the design of the collimation angles and (6) improvement in positioning of the subpixels to improve directional color matching between tiles. This patent will be focused on optimization of these factors for large flat panel displays assembled from a 1×N array of AMLCD tiles.

BRIEF DESCRIPTION OF THE DRAWINGS

A complete understanding of the present invention may be obtained by reference to the accompanying drawings, when considered in conjunction with the subsequent detailed description, in which:

FIG. 4c shows a schematic of the wiring coming from one side of an FPD (column direction) for use with a 1×N array of tiles for the pixel schematic shown in FIG. 4a;

FIG. 13 is an illustration of the seal flow after squeeze (lamination) of the CF substrate to the TFT substrate with spacer balls determining the cell gap there between;

DESCRIPTION OF THE PREFERRED EMBODIMENTS

Generally speaking, the present invention features a tiled, flat-panel, color display that is visually seamless under the intended viewing conditions. The seams become effectively invisible when they do not produce image segmentation, and their brightness, color and texture appear equal to the spaces between the lightvalves residing on the same tile. A number of techniques are described that affect the design, construction and assembly of the tiled display, making the display appear seamless.

Figure 1:
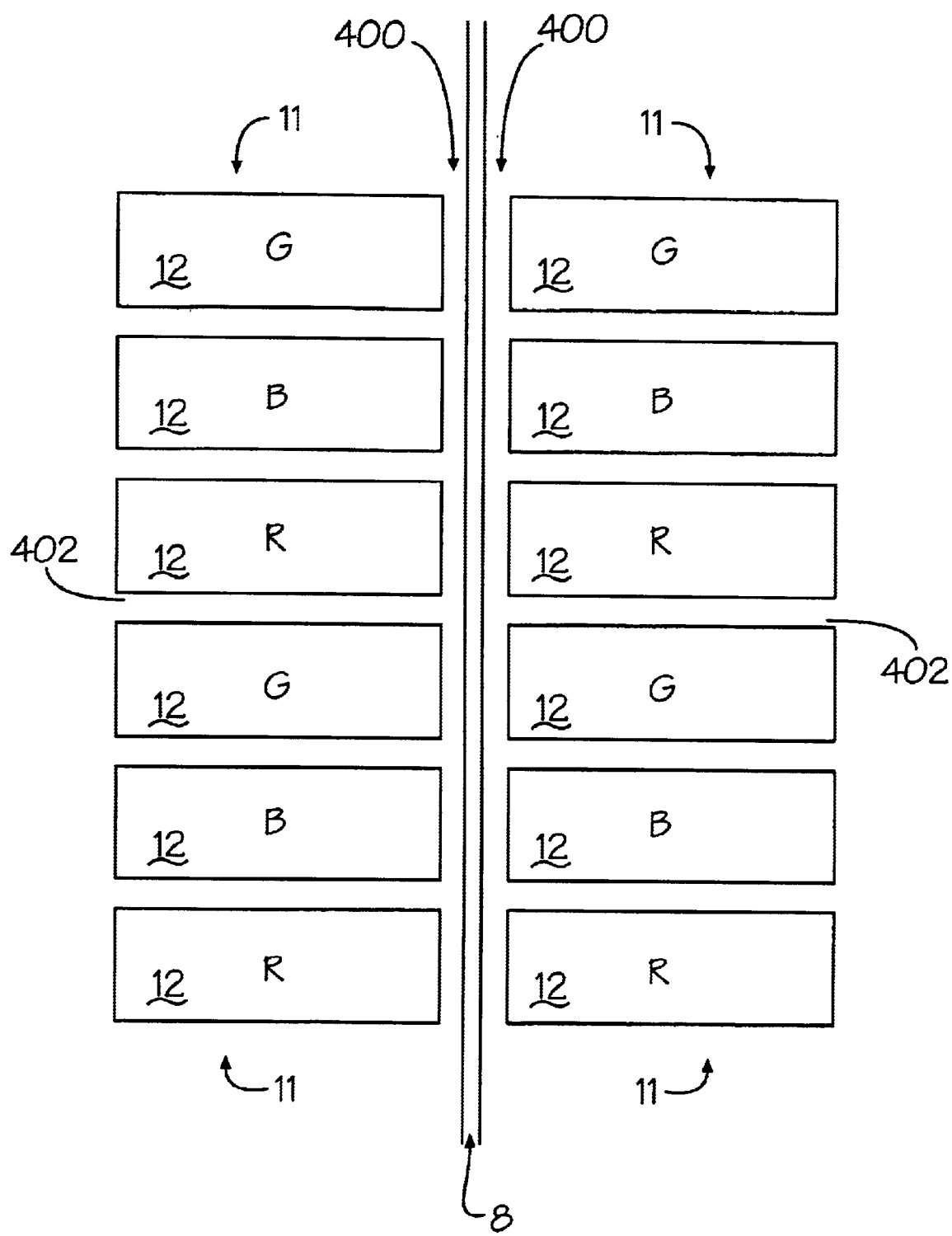
FIG. 1 shows a schematic, plan view of a typical, tiled, array of pixels in a color, electronic display, in accordance with this invention.

FIG. 1 shows a schematic, plan view of a typical, tiled display having arrays of pixels 11 arranged into tiles with seams 8 therebetween. Each of the arrays of pixels 11 comprises primary color elements (sub-pixels 12) R, B and G (red, blue and green) in the preferred embodiments. The number and selection of the primary colors is not limited to this set, however. Note that the space 400 between pixels is less in the vertical direction than in the horizontal direction which has no seams. This allows the horizontal dark space 402 in the CF mask to be smaller and the aperture larger in the vertical direction than in the horizontal direction for increased light efficiency. Also note that the subpixels 12 are in an orientation where discontinuities in lighting at the vertical seam will have a minimum impact on color shifts since the 3 subpixels 12 GBR are equally impacted and there are only vertical seams 8.

Figure 2:
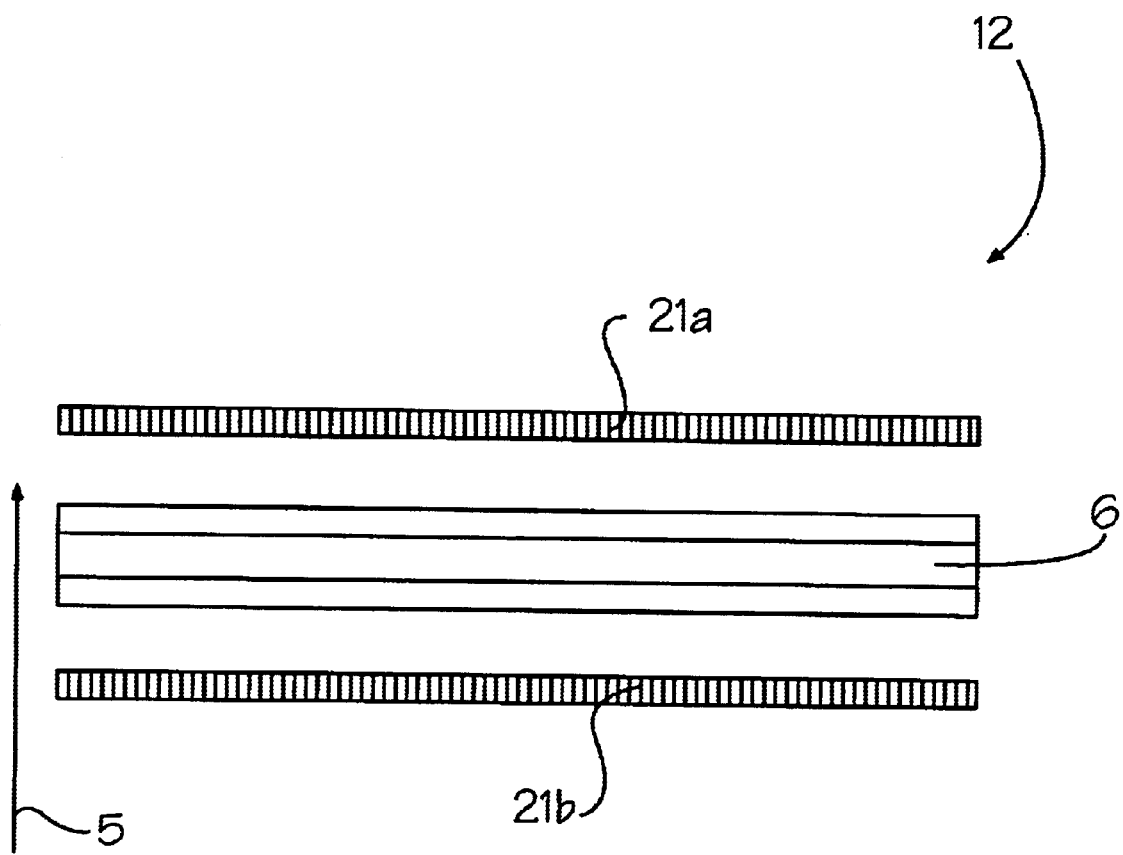
FIG. 2 is a schematic, cross-sectional view of a lightvalve used in a flat-panel display with a backlight.
Figure 3:
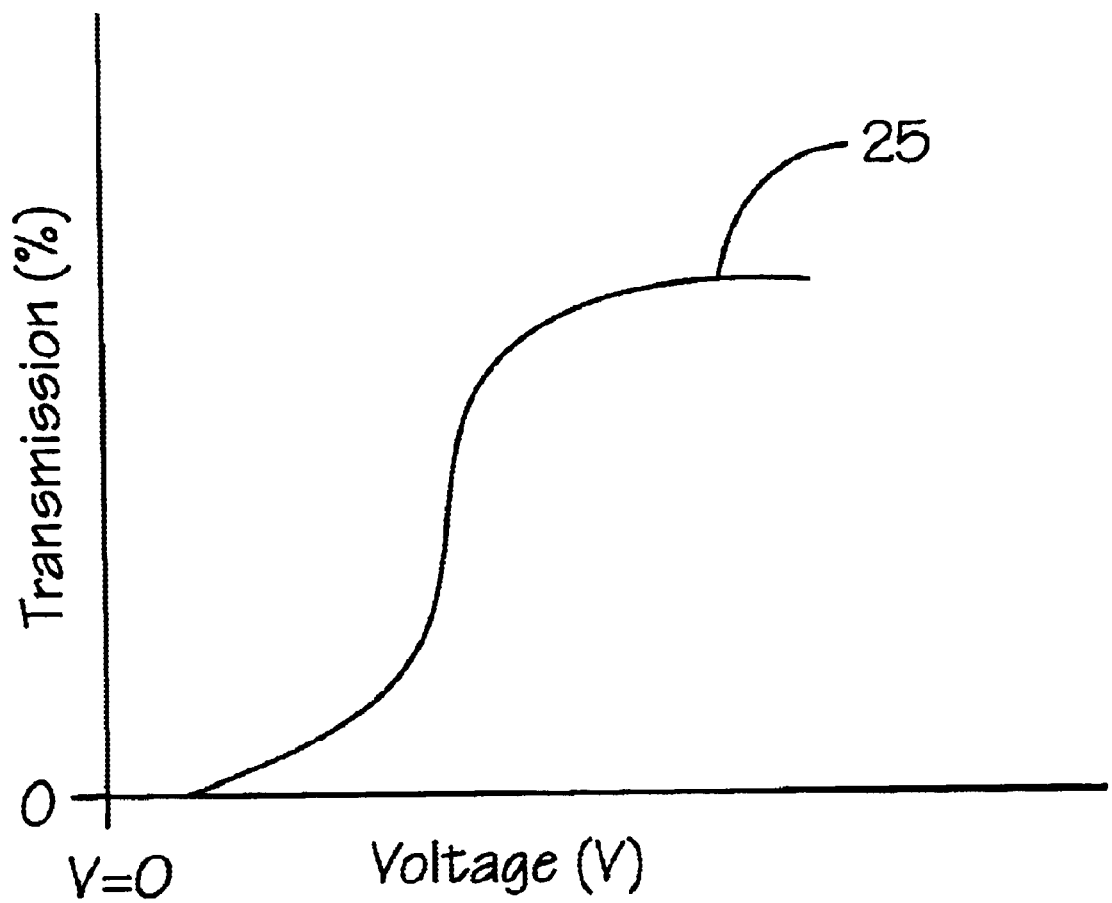
FIG. 3 depicts a graph of a typical light transmission voltage curve for a lightvalve in an active matrix liquid-crystal display.

Referring to FIG. 2, a cross-sectional view of a typical lightvalve (sub-pixel) 12 used in flat-panel displays is illustrated. In a flat-panel, liquid-crystal display (LCD), light is generated in a separate backlight assembly (not shown) and projected (arrow 5) through the lightvalve 12 towards the viewer, not shown. The lightvalve 12 is formed by two polarizer sheets 21a, 21b placed on opposite sides of an optically-active, liquid-crystal layer 6. Light passing from the backlight (not shown) through the lower polarizer sheet 21b becomes linearly polarized. When an electric field is applied to the liquid-crystal layer 6, it turns the plane of polarization of the transmitted light by an amount that monotonically increases with the magnitude of the applied electric field. The top polarizer layer 21a lets pass only the polarization component of the light that is parallel to its polarization plane. By varying the magnitude of the applied voltage, the lightvalve 12 thus modulates the intensity of the transmitted light in a continuous fashion, from fully off to fully on. A typical, light-transmission, applied-voltage (TV) curve for LCD materials used in active matrix liquid-crystal displays (AMLCDs) is depicted in FIG. 3. Since these TV curves for sub-pixels 12 may deviate near a seam 8 for many reasons as discussed in our co-pending U.S. patent application Ser. No. 09/368,921 filed Aug. 6, 1999 and included herein by reference, it is preferable that all 3 colors be impacted equally so that chromaticity and color gamut are impacted minimally in the horizontal direction which has the widest view angles.

Figure 4A:
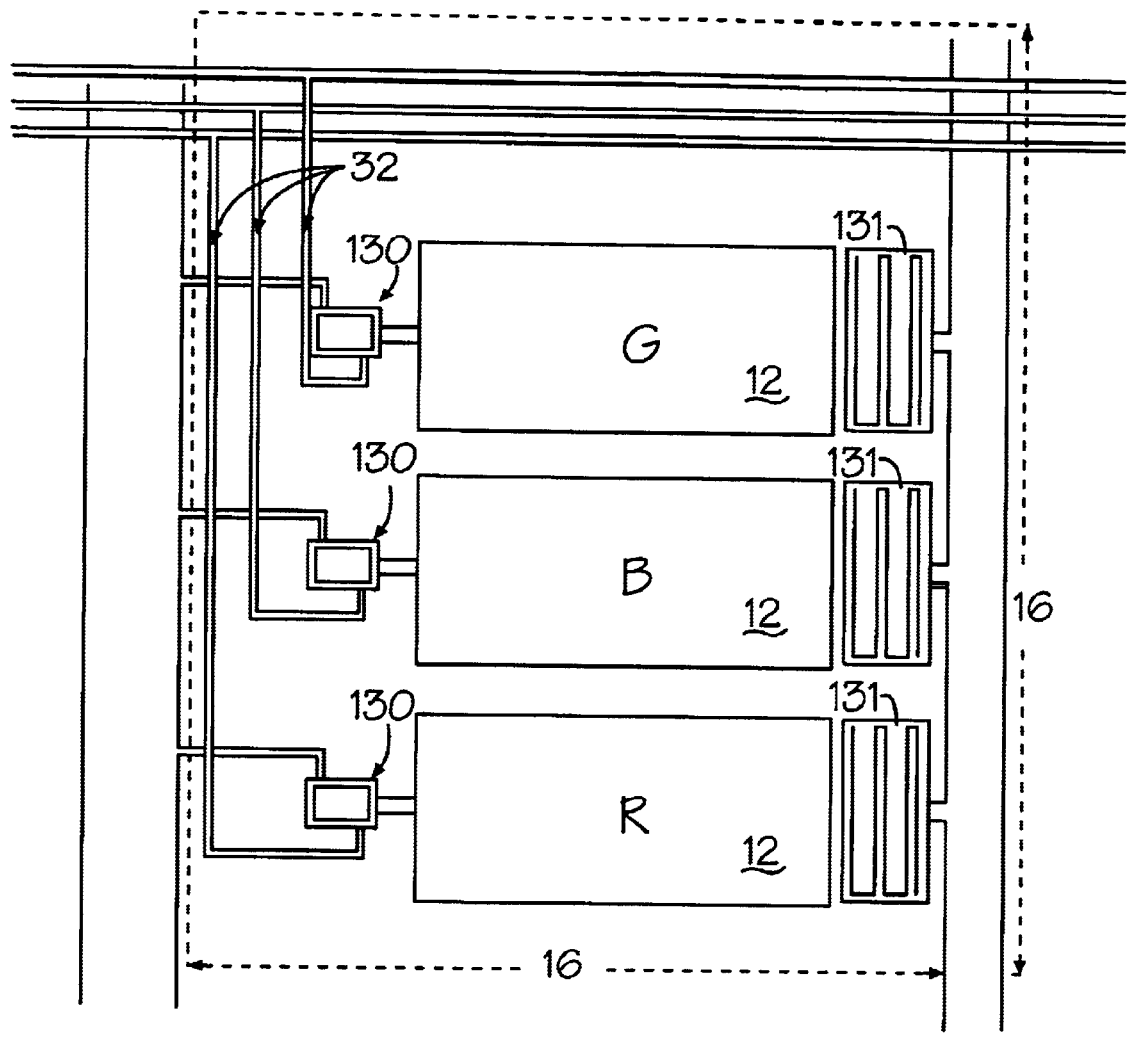
FIG. 4a shows a schematic diagram of a color pixel with three lightvalves, three different source lines and one gate line for the selection of each color valve, including devices for activating the lightvalves.
Figure 4B:
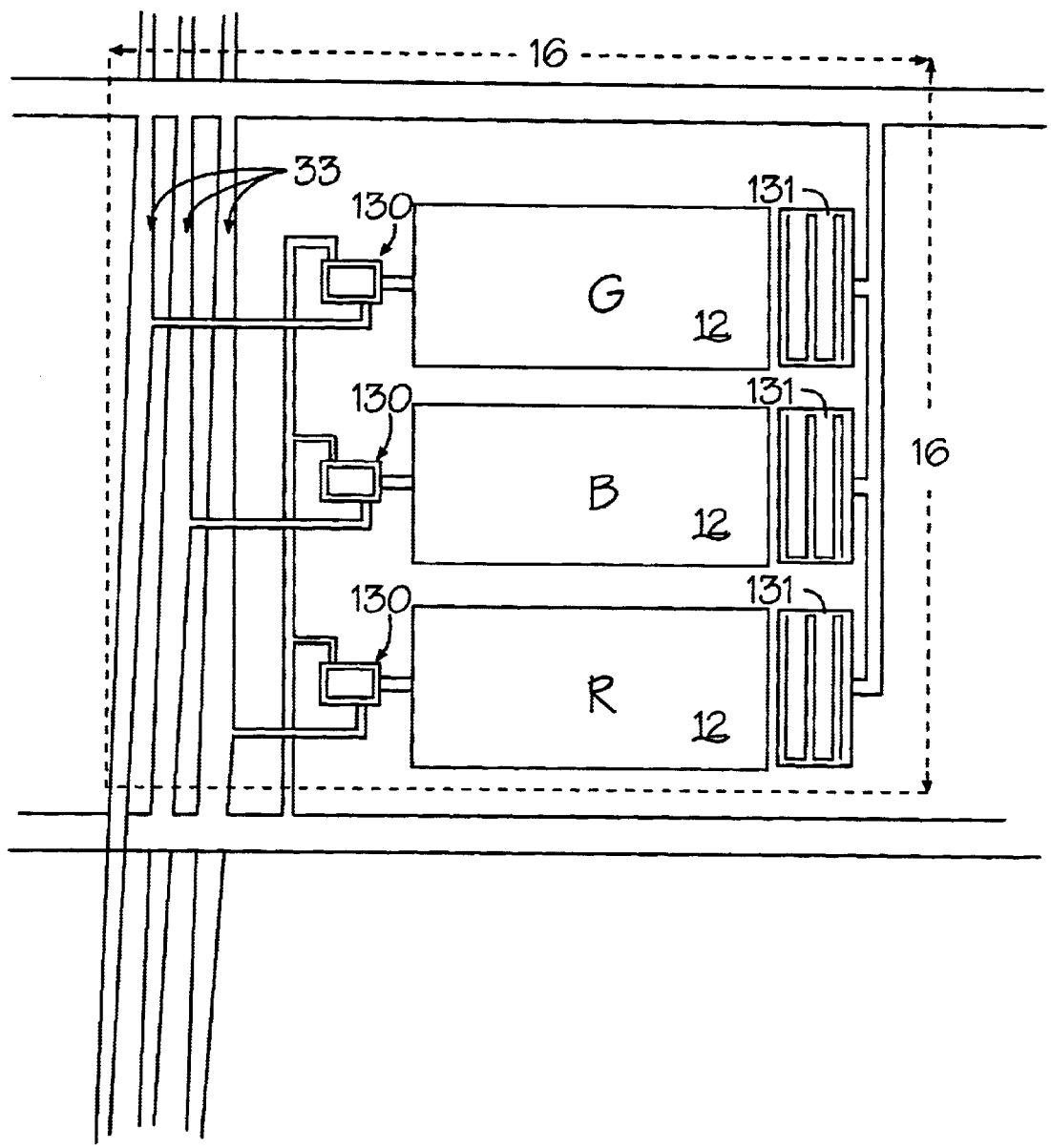
FIG. 4b shows a schematic diagram of a preferred design of a color pixel with three light valves, three column lines and one row line for the selection of each color valve, including devices for activating the light valves.
Figure 4C:
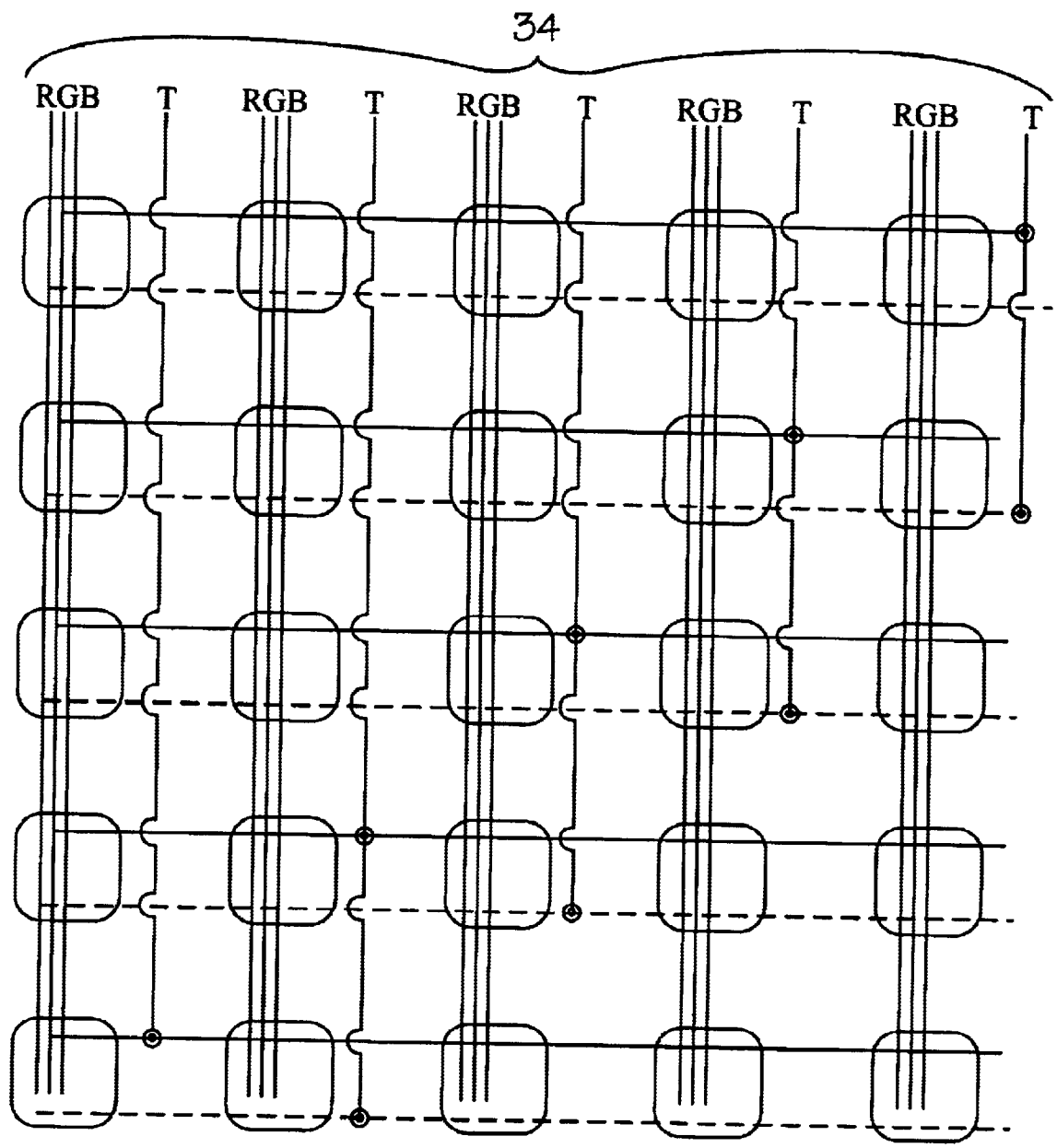
Figure 4D:
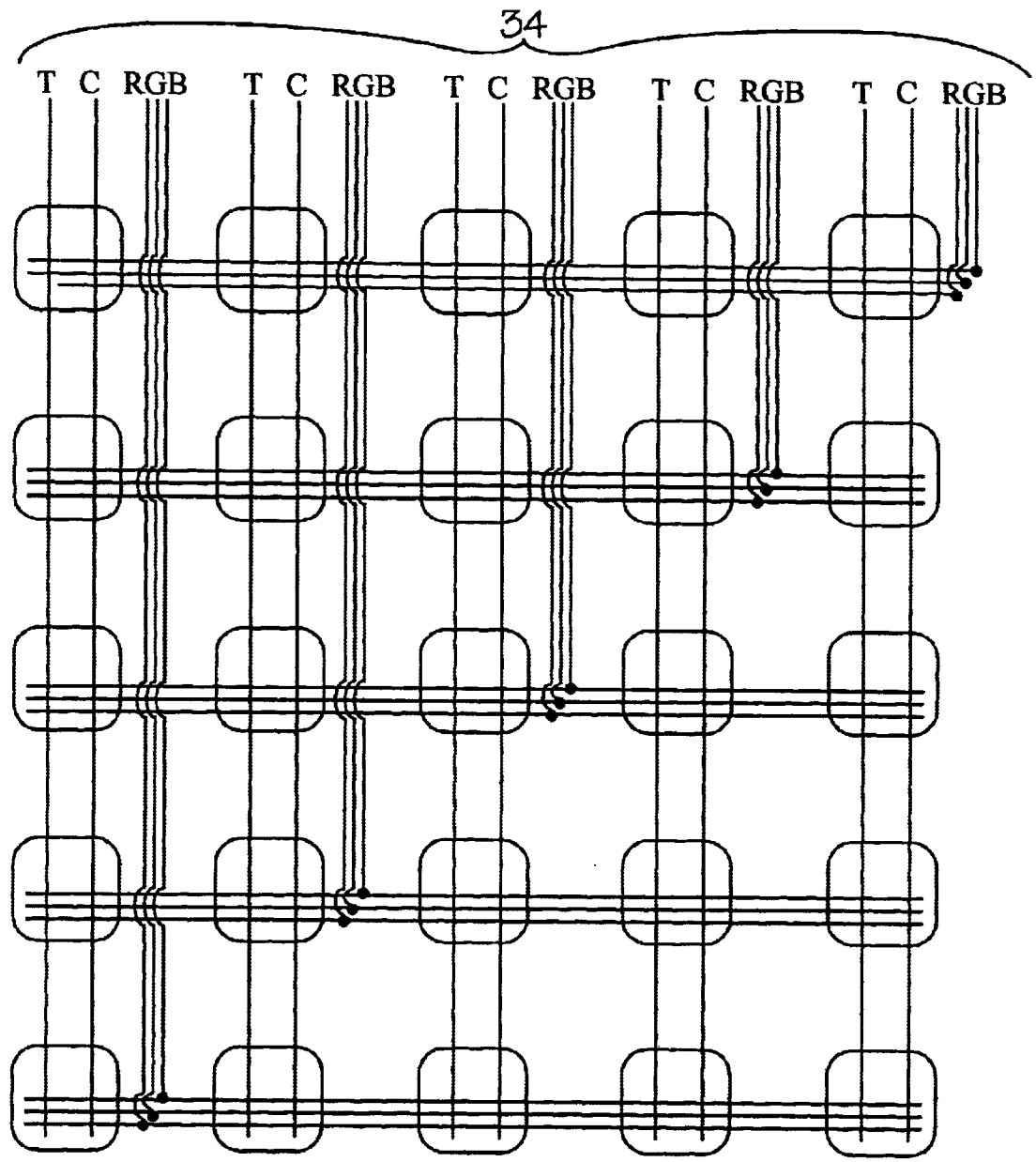
FIG. 4d shows a schematic of the wiring coming from one side of an FPD (column direction) for use with a 1×N array of tiles for the pixel schematic shown in FIG. 4b.

Referring to FIG. 4a, single lightvalves (sub-pixels) 12 are shown covering a pixel pitch area 16 for color display applications. In a conventional AMLCD, the lightvalves 12 comprise a thin film transistor 130 (TFT) and a storage capacitor 131, in addition to the liquid crystal cell, the transparent electrodes (not shown) and the polarizers (21a, 21b FIG. 2). The TFT 130 is used as the active non-linear device. A wiring configuration 32 for activating the sub-pixels is also shown. A second wiring configuration 33 for the sub-pixels 12 is shown in FIG. 4b. The interconnection is achieved in this preferred design by one or two sided addressing 34 at the top and/or bottom sides of the tiles in the 1×N array of tiles as shown in FIG. 4c and FIG. 4d. The interconnection design in FIG. 4c is used with local sub-pixel wiring of FIG. 4a while that in FIG. 4d is used with the sub-pixel wiring shown in FIG. 4b. The area containing lightvalves (sub-pixels) 12, TFTs 130, storage capacitors 131 and wiring is referred to as the sub-pixel environment. The design choices made result in a sub-pixel environment having predetermined electrical, mechanical, and optical properties. The sub-pixel environments each typically have a green, a blue and a red environment, each of these environments being substantially identical and independent from one another. It will be understood that each of these green, blue and red environments will be influenced differently by factors such as wiring configurations outside of their respective environments. For example, the green environments of the uppermost pixels shown in FIG. 4a are closest to the signal lines disposed horizontally at the top of FIG. 4a. Consequently, capacitive, inductive and similar electrical effects may measurably effect the green environments differently than the blue or the red environments located further from these signal lines.

Figure 5:
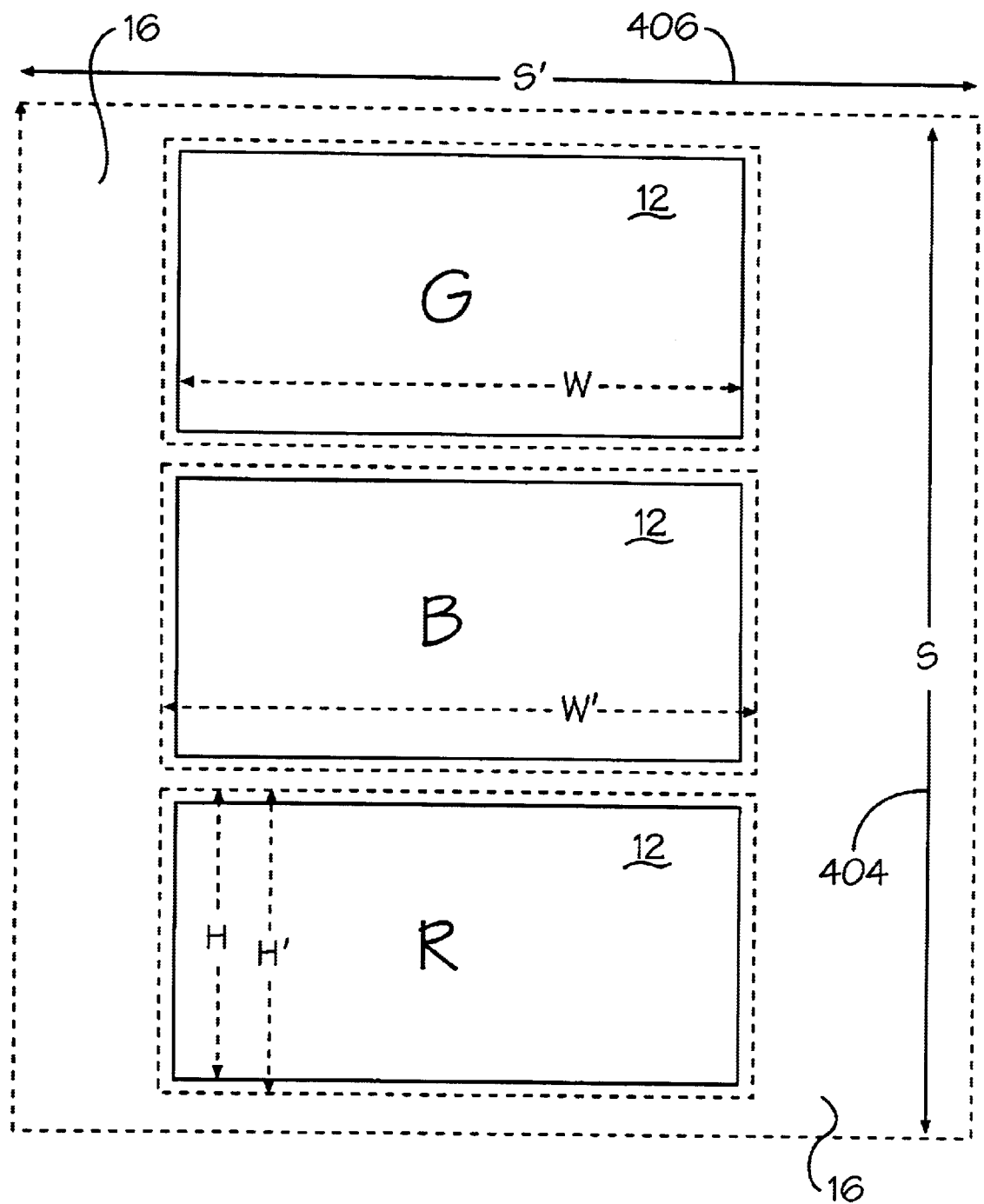
FIG. 5 illustrates the floor plan of a color pixel with three lightvalves, associated color filter sub-pixels with dark space surrounding the sub-pixels.

In electronic color displays, separately controlled lightvalves 12 are placed in the pixel pitch area 16, as shown in FIG. 5. One color element is assigned to each of the primary colors. A color filter layer (not shown) is placed on top of the lightvalves 12 within pixel pitch area 16. Light having the desired wavelength spectrum corresponding to only one of the color filter regions passes through the lightvalve 12 and the aligned color filter layer.

Assume that the dimensions of each of the apertures is W×H, as shown in FIG. 5. The H dimension is somewhat smaller than the pitch S, 404, divided by 3 for color displays (FIG. 5). W is also somewhat smaller than S', 406. Generally, pitches P and P' will be substantially equal, but other relationships may be possible. A further fraction of this light passes through the second matching aperture defined in the color filter layer 18 (FIG. 5), with the given dimensions of W'×H', where W'>W, and H'>H, in order to allow for misalignment of the TFT to the CF during assembly.

A tiled lightvalve assembly 154 as described above is shown in FIG. 6 in cross-section. It consists of tiles 19, bottom plate 20, with thin film TFT structures 24, top plate 21, containing the color filter 18 and dark spaces 30. These are enclosed by the glass cover plate 22 and glass back plate 26, and masks 23. The sub-pixel apertures 17 form the actual image source plane of the display, while the screen 25 which forms the view plane is external to the glass cover plate 22 and polarizer sheet 21b. Other positions for screens, masks and polarizers presented in the sequence to the light are also effective for tiled displays. For example, the screen 25 may be on either side of the mask 23 on the bottom surface of the cover plate 22 with the polarizer 21b positioned between these components and the tiles. Also the polarizer 21a and the back plate 26 may be on either side of the mask 23. The masks 23 are horizontal and vertical narrow lines that are located to be coincidental with the dark spaces 30 in the AMLCD tiles 19.

The color filter layer 18 in this preferred embodiment is inserted on the topside of the LCD fill material into close proximity of the image source plane in all conventional LCDs, in order to avoid parallax. Typically, the thickness of the LCD layer is less than 10 μm. However, if collimated or partially collimated light is used, the color filter layer 18 may be located alternatively further from the image source plane, for example, on the cover plate 22 below the screen 25. The typical glass sheet 20, 21 thickness used in LCDs is between 0.7 and 1.1 mm. The tile component glass sheets 20 and 21 carry the transparent electrodes (not shown) in their thin-film layers and usually comprise indium-tin-oxide material (ITO). The lower glass plate 20 usually carries the X-Y interconnect for matrix addressing, in addition to the non-linear TFT 130 control devices and the storage capacitors 131 for the lightvalves 12 (see FIGS. 4a and 4b), for image stabilization. The design layout for these is very important for tiling. As shown in this disclosure all of the area needed for the components other than wiring is covered by the column dark spaces, conserving much of the area along the row direction for aperture.

The upper glass sheet 21 carries another transparent electrode and the patterned color filter layer 18. The backlight (not shown) acts as a diffuse source, with light rays emanating into the full half-space above the source. A fraction of this light passes through the aperture of a lightvalve 12 in a specific pixel defined in the thin film layer 24.

Figure 6:
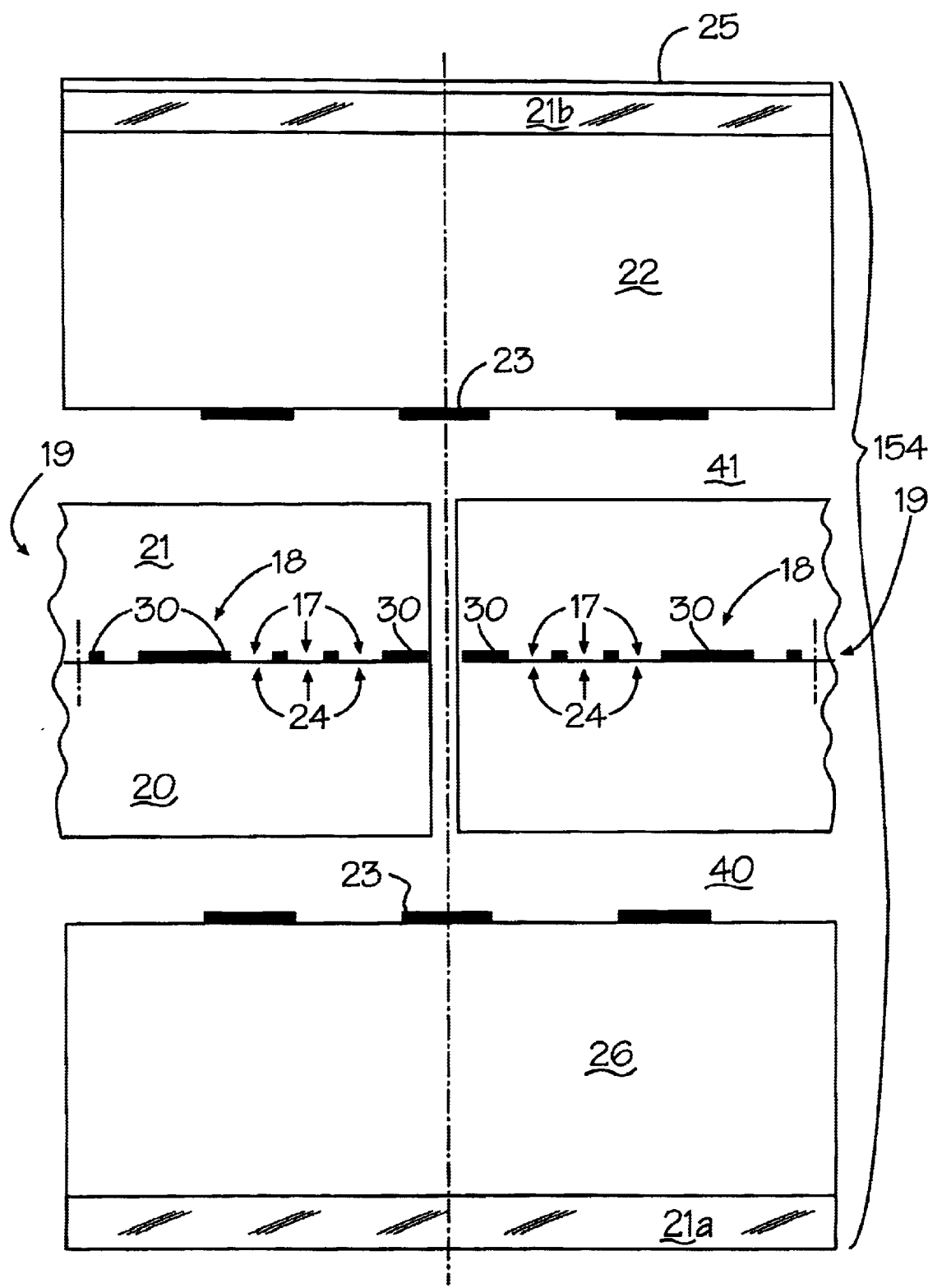
FIG. 6 is a schematic, cross-sectional diagram of pixels with three lightvalves for an active matrix liquid-crystal tiled color display near a seam with cover and back plate, polarizers, masks, and screen.

A spacing d (not shown) between the two thin film apertures is determined by the optical design requirements of the display, with the optical path length through the liquid-crystal layer being the primary factor. The spacing d is always much smaller than W or H, (FIG. 5), and is typically about 5 μm for an AMLCD. As a consequence of the very small aspect ratio d:W, a very wide, angular range of light rays can pass through the display stack 154. (FIG. 6). For a conventional AMLCD with pixel width P=300 μm for the three subpixels and pixel pitch in the range of 400 μm, and d=5 μm, the limiting rays form angles of greater than approximately 75° with the surface normal of the display. Therefore, light normally spreads in the top glass plate over a wide lateral distance, overlapping several other pixels. Only an angle of 15.2° normal to the surface is required for a 1.1 mm-thick top plate 21 for the light to reach the adjacent pixel with the above, sample parameters in conventional, non-tiled, AMLCD displays.

In addition to these two apertures, reflection and refraction processes take place at each optical interface where the refractive index changes or a reflective material is encountered. For a glass-to-air interface, with refractive indices of 1.5 and 1.0, for example, the angle for total internal reflection is 56.3°. Therefore, the limiting primary rays escaping from the display stack towards the viewer are not limited by the aspect ratio of the aperture, but by total internal reflection. Nevertheless, the permissible angles for the limiting rays are much larger than the angle required to overlap adjacent pixels.

A great number of secondary light rays traverse in the transparent glass stack, in addition to the primary rays originating from the backlight and passing through the lightvalves. When diffuse light emanating from the backlight is passed through the glass stack, it undergoes optical refraction and reflection processes, including lateral reflective and refractive waveguiding. These processes redistribute the secondary rays in the glass stack, so that some light is transmitted through all points of the display outside the primary rays controlled by the lightvalve apertures. Secondary rays, in combination with ambient light entering the display from the top surface, form background light that influences the contrast of the display. In order to maximize the contrast, the intensity of secondary rays must be minimized. Contrast ratios larger than 100:1 have been demonstrated in state-of-the-art AMLCDs.

The contrast ratio is a function of the following: a) cone angles of light transmitted through the aperture, b) the aperture shapes, and c) the orientation of the liquid crystal which is determined by the liquid crystal material and the rubbing directions of the polyimide interface layers on the TFT and CF substrates. In the 1×N array, the lack of a seam in the horizontal direction allows opening up the aperture in the vertical direction and thereby a wider cone angle in the vertical direction. The cone angle in the vertical direction is therefore chosen by compromise tradeoff of intensity vs contrast, both being very important human factors in a tiled display.

The range of perception thresholds for image segmentation and discrimination of brightness and color differences are determined by a human observer, as described in detail hereinbelow.

Monolithic displays are laterally uniform, and secondary light does not pose any special optical problems, apart from the edge pixels that can be extended and covered over. In tiled displays, however, the situation is completely different. The structure abruptly changes at the seam of each tile. Therefore, both primary and secondary rays are affected by the presence of a seam, and any seam is generally visible unless it is significantly modified. The visibility of the seam can be rigorously demonstrated using the following model. Assume that the brightness of two adjacent tiles is the same, but undergoes an offset at the seam, which is shown in FIG. 6 as a gap. By performing a Fourier analysis of the resulting light intensity profile, and relating this to the resolving power of the human eye, the following equation for the threshold width θ of the seam, under high illumination conditions (500 nit or cd/m²), is:

$$\theta = 3.5(\Delta I/I) \text{arc sec} \quad (1)$$

where $\Delta I/I$ is the relative intensity modulation at the seam. (See Alphonse, G. A. and Lubin, J., "Psychophysical Requirements for Tiled Large Screen Displays", SPIE Vol. 1664, *High Resolution Displays and Projection Systems*, 1992.) Equation 1 has been confirmed by psychophysical testing, showing that both bright and dark seams are equally visible. For a relative intensity modulation of 1 or 100%, at a viewing distance of 50 cm, Equation 1 shows that the maximum width for an invisible seam is 8.5 μm for this intensity modulation. Since tiling functions cannot easily be accomplished in 8.5 μm seam widths today, tiled displays are constructed with special designs that drastically reduce the intensity modulation at the seam.

The techniques presented in U.S. Pat. No. 5,661,531 for designing, constructing and assembling tiled displays with invisible seams was grouped into the following six distinct categories, described hereinbelow in detail:

(1) alteration of the image plane,
(2) generation of an image view plane apart from the image source plane,
(3) collimation, or partial collimation, of light to prevent primary light rays from reaching the seams,
(4) suppression of secondary rays emanating from the gaps between the lightvalves in the pixels,
(5) enhancement of the range of view angles presented to the observer by the tiled display, and
(6) enhancement of the brightness of the tiled display assembly.

This invention deals with optimization of these same six categories and, in addition, deals with color richness of the individual sub-pixels in a large tiled display employing monolithic masks. The monolithic masks, preferably placed on cover and back plates, cover the seams and also have stripes at all dark spaces between pixels, smoothing out the appearance of optical differences between the seam areas and the dark spaces. The masks counteract the uncertainty of the locations of the cut edges of the tiles and their positioning accuracy, since these areas are well hidden from the collimated light. In this preferred embodiment, with tile arrays of 1×N, the primary mask lines are vertical. Thus any shift of the mask relative to the location of the subpixels, with orientation as shown in FIGS. 4a and 4b, shades all three subpixels equally, substantially eliminating color shifts and view angle dependence of color shifts in the horizontal direction. Furthermore the luminance remains essentially constant with such shifts.

Horizontal mask lines are of secondary importance and may be of a width to optimize the human factors, especially contrast vs intensity. A shift in position of a tile vertically during assembly to the cover plate mask either covering more of a sub-pixel or opening more sub-pixel to the light coming through the masks changes the intensity level and color over the entire tile relative to a neighboring tile. This intensity variance is smoothed by the software and electronics applied to the pixels near the seam and for the entire tile as described in our co-pending U.S. patent application, Ser. No. 09/368,921, filed Aug. 6, 1999. This is the current preferred embodiment for a 1×3 or more generally for a 1×N array of tiles where N is equal to or greater than 2.

Furthermore, this preferred tiling design clusters the sub-pixels 12 together as closely as possible for the entire pixel as shown in FIGS. 4a and 4b, making the pixels rectangular rather than square. This is accomplished by moving the local wirings 32, 33 of the TFT to columns; the wiring in between the sub-pixels may be eliminated. These are unique design modifications focused on improving the tiles for application to tiled FPDs and have the effect of increasing the aperture ratio in the vertical direction. The image source plane of a tiled display is preferably designed and the masking external to the tiles is arranged so that the image appears as a uniform array of pixels with a constant pixel pitch S, both in transmitted and reflected light, irrespective of the presence of the seams and their approximate locations. For close distance viewing this arrangement may appear grainy, but for appropriate distances for larger displays, the images are better than most large display technologies.

First, therefore, all physical space required by tiling must fit into the space provided by the substantially uniform pixel pitch determined by the monolithic masks within the tiles. For LCDs, the seam must accommodate two seals at the tile edges and the associated tolerances in cutting the tiles at the narrow seal edges to be described below, substantial tolerance deficiencies in the location of tiles one to another, and possibly some space for metal interconnect for the matrix addressing of each pixel or protective diodes etc. This requirement limits the achievable minimum pixel pitch in tiled displays. Second, the space between lightvalves on adjacent tiles must be made to appear the same optically as the pixel spaces on the same tile. This can be accomplished by placing light shields into the image source plane between adjacent lightvalves and by minimizing the tile to tile spacing (the open seam area) so that these light shields almost fill the space between tiles. The non-transparent, thin film materials used for making the TFT device interconnect or CF light shields can be used for light shielding on the tile. The separate light shields (masks on cover and back plates) noted above are preferably placed to block direct light rays from passing through the gap at the seam, and are aligned to the thin film masking within the tiles, during the process of assembling the tiles to cover and back plates. Finally, the front side optical reflectivity of all light shield layers placed into the spaces between lightvalves should be as uniform as possible. Furthermore, the light shields plus the absorption effects of the CF decrease the impact of the intense back light used in tiled displays on the light activated leakage of the TFTs.

Generation of Image View Plane

The image source plane in a flat-panel LCD is formed by the lightvalve apertures in the thin film layer underneath the optically-active liquid-crystal layer. For practical purposes, the color filter can be considered to reside in the image source plane as well, since the thickness of the liquid-crystal layer is on the order of only 5 µm. Even with the state-of-the-art, high-resolution pixel pitch of 0.2 mm, this gives a height-to-width aspect ratio of 0.075 for the color elements, which produces a negligible parallax error for normal viewing conditions. However, if mask layers or aperture plates are used on the top surface of the thinnest available, upper glass sheet with a thickness of 0.7 mm, the height-to-width aspect ratio with the same pixel pitch increases to 16.5. This results in an unacceptably large parallax error, unless the image source plane is viewed close to the direction of the surface normal. In order to avoid this parallax problem, the image source plane must be projected into a separate image view plane, which must be generated from the image source plane using a number of well-known optical techniques. This allows the CF if desired to be proximate the image view plane in alternative assembly embodiments.

First, as noted above, the seams are hidden from direct view by placing a monolithic face mask on the common coverplate over all seams and dark spaces between pixels. Preferably the cross section design will minimize the distance between the mask and the tiles. This may be achieved by placing the polarizers on the outside of the cover plate and back plate surfaces and by placing the masks on the inside surfaces as close to the tiles as the composite adhesive system 40, 41 allows, as shown in FIG. 6. The composite adhesive thickness is preferably minimized between cover plate and tiles, and between back plate and tiles as referenced in U.S. Pat. Nos. 5,867,236 and 6,133,969 and co-pending application Ser. No. 09/368,921, filed Aug. 16, 1999, all of which were previously included by reference. Furthermore, it is preferred that the tiles are made with 0.7 mm or thinner glass to minimize the seam area, the edges of the glass, and to improve the limiting optical angles. It is desirable to cover the gaps between the lightvalves on the same tiles, as well, with the same face mask, in order to match the light reflection characteristics with those of the seam gaps, and in order to control secondary rays, as described herein below.

Second, predetermined optimized optical elements can be used to perform the actual forward projection of the image. A number of optical techniques, including but not limited to arrays of refractive microlenses, holographic lenses, diffusive screens, lenticular screens and Fresnel screens can be used to perform the projection. These optical techniques can be designed to meet or exceed the typical view angle requirements of state-of-the-art AMLCDs and are important also in hiding the seams. Since the image quality of the tiled display depends on this projection, care must be taken to maintain a uniform focus and contrast over the entire area of the display. Accordingly the preferred designs of screens for a 1×N array of tiles with vertical seams (and no horizontal seam) will provide different optimized view angles vertical and horizontal.

Collimation of Primary Rays

The primary rays should preferably be limited, so that they do not pass through any structures used for tiling, when passing through lightvalves adjacent or close to the seams.

The placing of a monolithic black mask behind and in front of this seam "hides" it from view, thereby rendering the display seamless in a forward direction, within defined angles. A seamless display at large angles is created, however, when light is collimated to the extent of minimizing the primary and secondary light in the seam area.

FIG. 6 shows a cross-section of a particular functioning embodiment of such a display. The display is illuminated by a collimated light source with a critical cut-off angle, described in our co-pending U.S. patent application Ser. No. 09/024,481, filed Feb. 17, 1998 and included herein by reference. Light enters the display through a polarizer, then a rear mask, then the LCD tile panels; and then exits through a front mask, a front polarizer, and finally a diffusion screen located at the image view plane.

Figure 7:
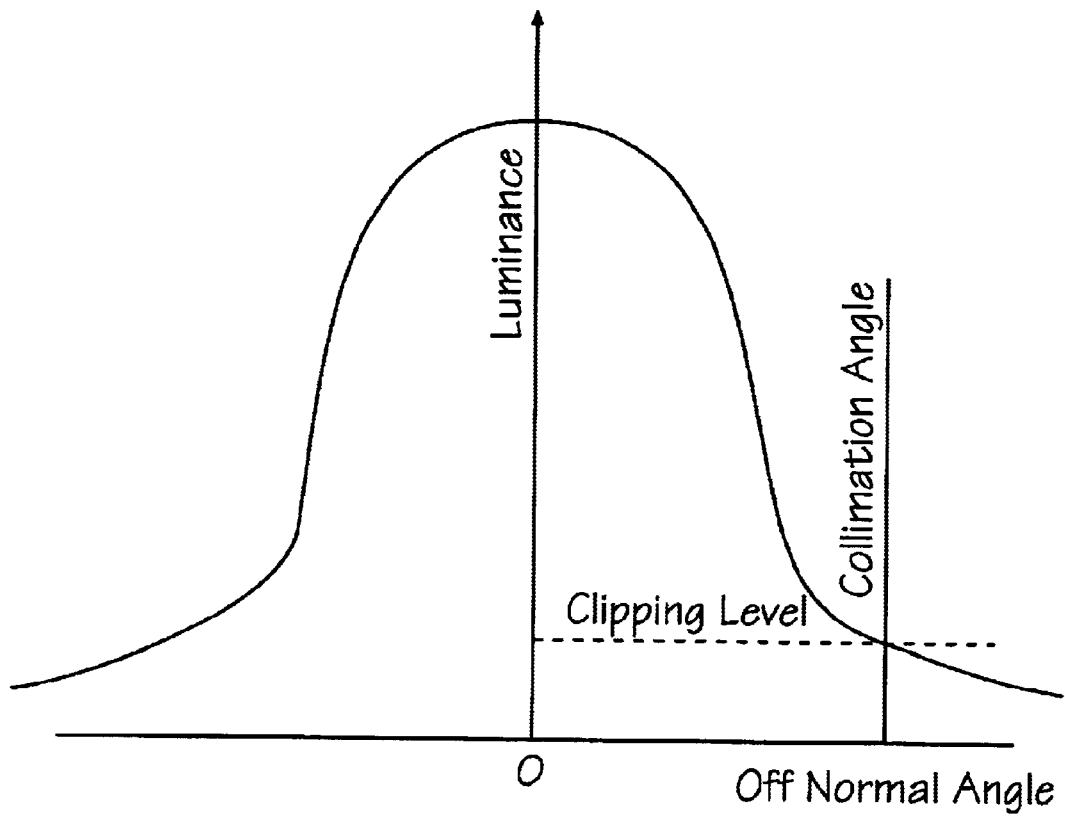
FIG. 7 is a graph of intensity versus light distribution for the light source to be used with a tiled display; collimation angles may be different in X and Y directions for the FPD.

FIG. 7 shows a measured example of a practical collimated light source. Maximum brightness occurs at normal incidence, with increasing attenuation at increasing "off-normal" angles (i.e., divergence). A preferred allowable clipping level is established, which then defines the collimation angle for a particular angular distribution of light coming from the back light behind the masks. For the 1×N design it may be preferable to have less collimation (i.e., more divergence) in the vertical as compared to the horizontal direction. Collimation decreases lighting efficiency but improves contrast when optimized to the aperture and the optical stack design for a given rubbing direction and LC twist.

Figure 8:
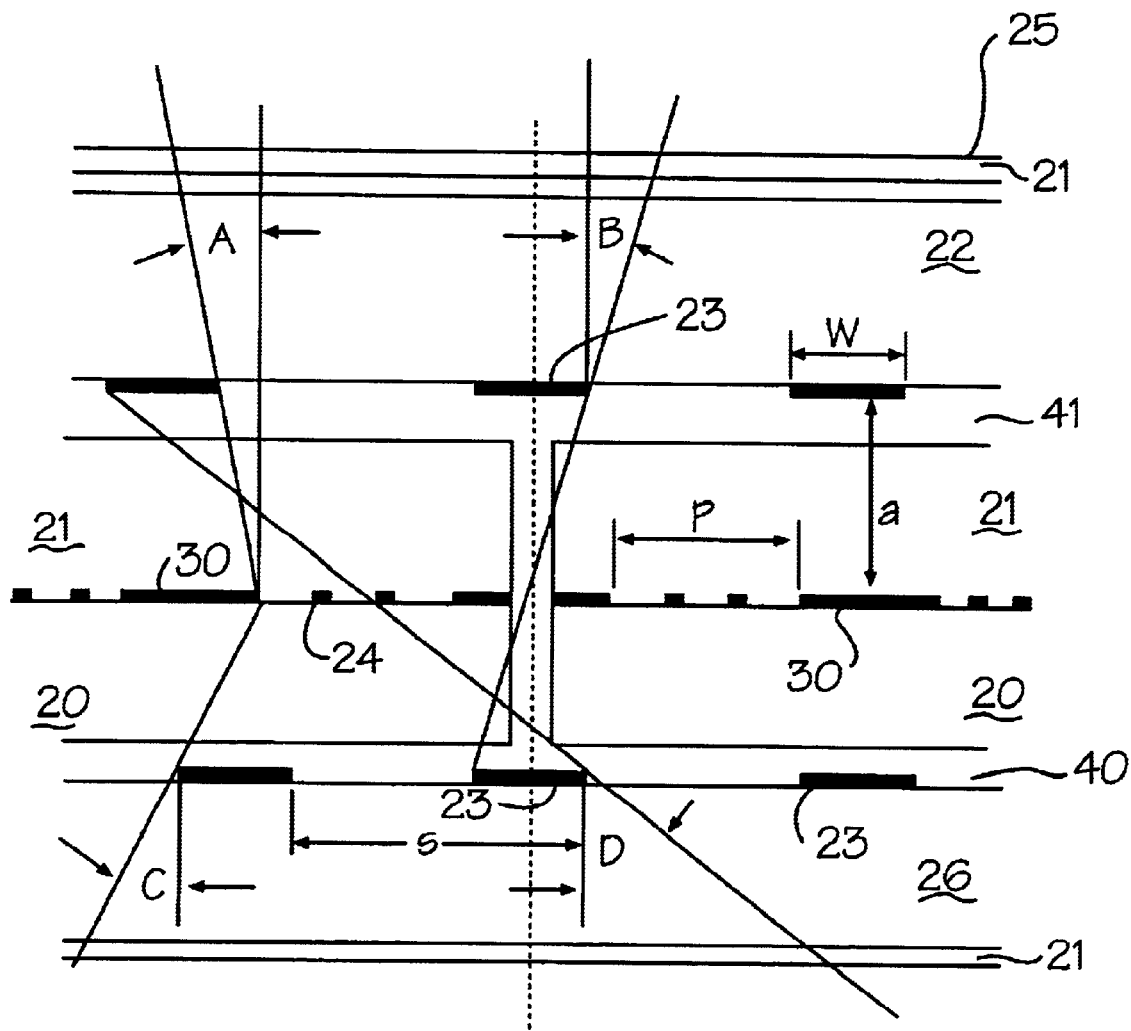
FIG. 8 shows a schematic diagram of the limiting angles of light rays passing through pixels and seam areas in the tiled FPD of the invention.

FIG. 8 shows a cross-section (not to scale) of physical dimensions in the display. Several angles can be derived from these dimensions. These angles have visual significance for seamlessness, shadowing, resolution, cross talk and light transmission efficiency to the viewer. If the collimated light entering the display exceeds limiting angles, these parameters are affected.

Perfect seamlessness is accomplished by complete blockage of the light entering and exiting the display by the front and rear masks near the seam. This technique requires an illumination source with a clipping level of zero at a collimation angle defined by "A". Larger angle A, which improves the case of achieving a seamless appearance, increases with increasing mask line width, increases with decreasing tile thickness, and also increases with decreasing adhesive thickness between the cover plate or back plate and the tiles. The light passing through angles, greater than A is also substantially blocked by the combination of the two polarizers, the collimating efficiency of the optics behind the mask and the light blocking efficiency of the structure in the seam area.

In a practical sense the clipping level shown in FIG. 7 need not be zero; a lower limit of light, not detectable through the seam, is determined by a percentage of the light permitted through a pixel when it is in the black state. This state is determined by the contrast of the polarizers blocking the light entering and exiting the seam and the depolarized secondary light rays caused by internal reflections for rays that have passed through the front polarizer. For this reason, the adhesive material between the glass plates is chosen to be substantially equal in index of refraction to that of glass. However, secondary rays may also result from internal reflections from the color filter dark areas, side walls of the tile enclosures and from non-collimated, secondary light entering from the front face of the display. Furthermore, the glass sidewalls in the seam area may be damaged to depths of several light wave lengths, i.e., in the range of a micron, also causing diffracted rays.

The rear mask casts a shadow on the pixel if the collimated light exceeds the angle defined by "B". Larger collimation angles, and more efficient lighting, result from using thinner tiles and thinner adhesive layers. Light exceeding angles B directly affect the color balance of the light exiting the display. If a collimation angle greater than "B" is chosen, the sub-pixel sizes, spectral content of the illumination source and spectral effects of optical components must be compensated for in order to produce a good "white" state. In addition, placement error tolerances of the rear mask to the pixel cause color shifts and imbalance between adjacent LCD panels, terminating at the seam, thereby adding to the visual detection of the seam.

Perfect resolution occurs when all of the light entering a rear mask aperture illuminates only one pixel. This is defined at a collimation angle of "C". If the collimation angle exceeds "C", the image produced at a pixel is projected into the adjacent pixel's aperture in the front mask, thereby decreasing contrast. Therefore, in the FPDs with tiled 1×N arrays, there are preferred angles of collimation different for horizontal and vertical directions. Substantially less collimation is preferred in the vertical direction.

One type of cross talk is defined by resolution. Another type can be defined as the limit where light from an adjacent rear mask aperture cannot exit the opposing adjacent front mask aperture. This is defined as angle "D". In reality, the collimation angle defined by adequate resolution or cross talk (angles C and D) can be practically larger since light must travel through a greater LC distance, which has less optical transmissibility.

A practical collimation angle for a tiled seamless display lies between angles C and D. The diffusion screen location relative to the other geometry can also affect seamlessness favorably by defocusing the image of the seam. In the ideal case the projected pixel images should not overlap but should fill the projected image plane. An overlap produces a light colored seam, while an underlap will create a dark seam. In the current design, the important angles are controlled by the masks and by a method of collimation which can be varied conveniently to achieve practical cut off angles as described in a co-pending patent application, Ser. No. 09/024,481, filed Feb. 17, 1998. In addition to the collimation of primary rays, the optical elements help to suppress secondary rays and enhance image contrast and focus. This varies with the pixel design, the masking, and the optimization of the seal.

The light transmission efficiency is determined by the product of the efficiency of transmission through each optical element. Referring to FIG. 8, one important contribution is dependent on the aperture ratio which is approximately $p^2/S^2$, where the pixel dimensions, p, are approximately square and where S is the pixel pitch. Therefore the seam width (S–p) is a major contribution to lighting inefficiency. In a 1×N array design the pixel may be rectangular with dimensions p-1 vertical and p-2 horizontal.

In our current preferred inventive design with a HDTV pixel density standard, the same display is able to show XGA monitor formats, the two formats being combined into one tiled display with 1284×768 pixels. This allows three identical tiles 19, a single part number with 428×768 pixels to be used. The dimensions for the control of the seal using CF dams 92 are shown in FIG. 9.

The allocation of dimensions is determined by the control of the seal front 200 (inner edge) approaching the sub-pixels 12. The seal front 200 is controlled by a dam structure 92 designed into the color filter 18. The dams 92 are actual vertical walls of CF material with spaces 96 between. The walls are of the order of 1 to 3 $\mu$m high or higher. The elements of the design are as follows: a) the buffer zone 91 between the sub-pixels 12 and the seal front 200 adjacent to the sub-pixels 12, b) the nominal width of the seal from the front to the glass edges, c) the tolerance for location of the finished glass edges (cut line) 100, and d) the assembly tolerances (not shown) for tile placement relative to fiducial location accuracy of tiles with cover plates and back plates, and machine assembly location repeatability. The allowance of a buffer zone 91 (optimized by seal material modification) approximately <25 $\mu$m between pixels and visible seal is experimentally determined for the seal material components. This buffer area 91 protects the sub-pixels 12 from a non-visible contaminant which impacts the twisting behavior of the LC in front of the seal and is dependent on the composition of the seal material. The seal front 200 location is determined by the accuracy and repeatability in positioning of the dispense tool syringe (not shown) and the control of the volume of seal material dispensed as well as the accuracy of the spacer ball 110 (FIG. 13) diameter and the lamination pressure in determining the cell gap on lamination of the CF to the TFT substrate. Dispense pads 94 (FIG. 13) of CF are located precisely in reference to the sub-pixels 12 and the final desired objective seal width. The dispense pad 94 is wetted preferentially by the seal material, assisting in locating accurately the deposited seal material (prior to lamination). Thus, the choice of s and p is a careful design tradeoff determined by in-depth knowledge of the technology and process parameters. For example, in the current design, FIG. 9, the preferred objective seal width will be in the range of 500 to 700 um, of which an approximate objective 250 to 350 um flows toward the pixels, and an approximate 250 to 350 $\mu$m flows away from the pixels. The approximate objective seal front resulting is about 65 $\mu$m from the pixels which allows for waviness of the seal front and tolerance in volume control so that the seal will not impinge on the pixels.

Figure 9:
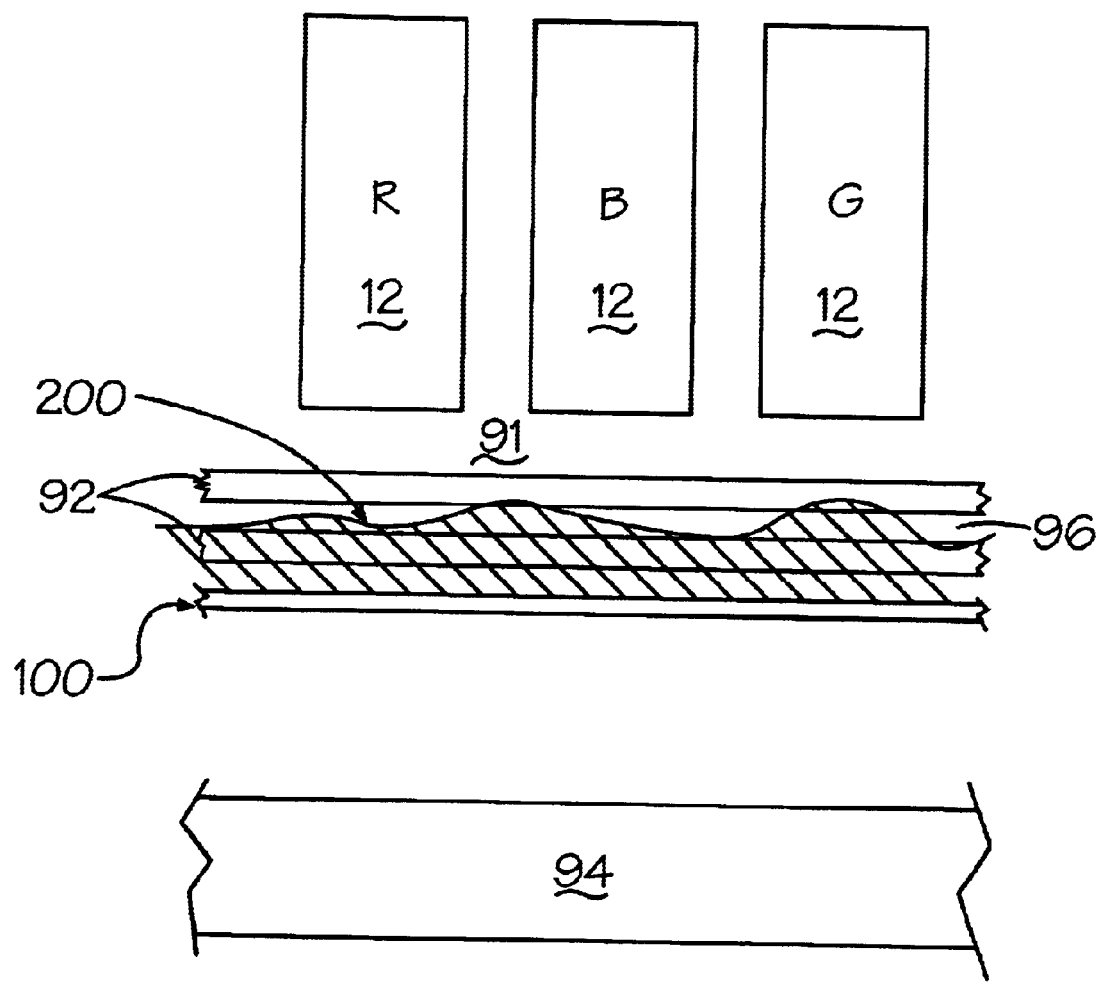
FIG. 9 depicts approximate location of CF dams, CF dispense pad, in reference to pixels for a preferred tile design near seams for an HDTV format tiled display, showing also the approximate seal location and the outer edge of a tile after cutting.

This placement objective locates the average seal front 200 between the two dams 92 shown in FIG. 9 and creates an average seal width of approximately 70 um after the tile is cut to dimensions. The dams 92 decrease the waviness of the seal front 200 as it extrudes during lamination.

The largest portion of s–p is related to the control of the seal material and the seal dispense process. the choice of these nominal dimensions determines the angles B, C, and D, discussed above and shown in FIG. 8. It is desired, as noted above, to decrease s–p, optimizing these angles for minimum shadowing, maximum resolution, and minimum cross talk while maximizing the aperture ratio for light transmission efficiency.

Two problems with seal polymeric material, noted above, are that it extrudes into a wavy front 200 during lamination of the CF plate to the TFT plate, and it generally contains an active or bonding diluting liquid which readily wets the CF structure and structures on the TFT substrate. If this front extrudes into the pixel aperture area, it prevents the LC from twisting and creates a defect in the desired pixel array. As shown in FIG. 9, this wavy liquid front 200 is controlled by CF dams 92 configurations spaced a precise distance from the sub-pixels 12. The preferable configuration is a double dam structure (FIG. 9) which is preferably spaced in coordination with the choice of seal volume and ultimate laminated seal width to be in the middle of the wavy liquid front. The seal front waviness without the dams is typically approximately 80 $\mu$m for 600 $\mu$m width seals and is thereby decreased to less than 50 $\mu$m when the dams are present, allowing the seal to be placed substantially closer to the pixels as compared to seals that are not dammed. As a result, with dams, less space is used for the seals, allowing s–p to be small and the aperture ratio to be increased, as compared to structures without dams. The current dam design structure is one example of many which can be applied to improve the tiled display optical efficiency. Improvements in dispense equipment in recent years, particularly in syringe design, Z height control, location precision, and pressure control allow designs with seal widths in the range of 600 um. Wet seal cross sectional area, before squeeze, can also be measured very accurately, to better than 5% accuracy, aiding in setting up the process to achieve the desired seal widths. For a 600 um width it is expected that volume control will be about 15 um half width.

It is also important to control the cell gap to be uniform near the tile edges. A detailed description of methods for maintaining cell gap uniformity, especially near corners, is included in our co-pending application, Ser. No. 09/368,921, filed Aug. 6, 1999. For a 1×N array of tiles there is no need to have narrow seal corners. One of the yield detractors at corners, overshoot is thereby circumvented. Also the radius of the corner can be specified to be remote from the corner pixels.

Furthermore, since the seals that will be made narrow are only disposed along vertical edges of the tiles in the tile array, the dispense speed can be maximized without concern for the momentum overshoot of the dispense tool. The overshoot, if present, will be on the edges containing the wide seals and will be distant from the pixels. This allows tile manufacturing to have a balanced throughput for TFT and CF and also for assembly of CF to TFT maintaining the same throughput for tiles as for other consumer products.

Clearly, seal designs, designs of CFs for seal dispense location and cell gap 99 control are substantially different for tiles to be used in 1×N arrays as compared to those for 2×N and N×N arrays which were discussed in previously filed patents. The preferred tile designs in the instant application are focused on the HDTV and SDTV formats which require narrow seals and seams only in the vertical direction.

Suppression of Secondary Rays

Secondary rays can originate either from the backside or front side of the display. Backside secondary rays emanate from the backlight and undergo a number of refractive and reflective processes. Ambient light provides the source for frontside secondary rays. Secondary rays have complex and essentially unpredictable paths in the display stack. In addition to the uncertainty of their behavior, additional optical phenomena occur in the structures that are tiled, such as reflection and refraction at the edges of the glass plates forming the display tiles; blockage of light rays in the seal materials; line-of-sight transmission of light rays through the gap between the tiles; and waveguiding of light through the gap between the tiles. In order to minimize the intensity modulation at the seams, the inter-pixel spaces in the interior of the tiles and at the edges of the tiles should preferably be made similar, from the optical point of view.

Secondary ray effects can be managed using the following techniques: (a) inserting light shields in the lightvalve layers (thin film or color filter levels) to block all rays outside the primary-ray envelopes in the image source plane; (b) inserting light shields into the gap between each adjacent tile surrounding each tile; (c) inserting further light shields into the regions on the tiles that are used for interconnect functions at the edges thereof; (d) inserting further non-transparent regions into the outer, light-shield layers used for light collimation, so as to block direct rays from passing through the display stack regions between lightvalves on the tiles or in the seams; (e) preparing the edges of tiles to well-defined optical characteristics to influence edge-scattering of light, for example, by making them fully trans-missive, fully reflective or diffusive; (f) filling the gaps between back plates and the tiles 40 and the gaps between the cover plates and the tiles 41 with an index-matching, optically-transparent compound; (g) inserting a face plate pattern or mask on the bottom surface of the cover plate, with opaque patterns above all regions not overlapping lightvalves in the image view plane, whether on the tiles or atop the seams there between; and (h) inserting light shields into the areas used for interconnection on the backplate or on tile carriers described in the aforementioned related patent application, Ser. No. 08/571,208, filed Dec. 12, 1995, now issued as U.S. Pat. No. 5,889,568.

Techniques in (a) block direct light rays from passing through the regions between the lightvalves in the image source layer. The technique (b) is preferably used in order to block line-of-sight rays from passing up through the gap between the two vertical faces of the tile plates, and to match the gap light transmission with that of the spaces between the lightvalves on the tiles. Technique (c) is also needed to match the optical transmission characteristics of the interconnect areas to the gaps between lightvalves in the interior of the tiles. The addition of matching light shields in (d) is effective both for the partial collimation of primary rays and the blockage of stray light rays. The need for technique (e) depends upon the optical quality of the edges of the tile glass plates. Scribing and cleaving, the usual way of cutting the tiles from larger sheets of glass, produces a near optical-quality surface that has a residual surface topology of more than several micrometers. Glass surfaces cut with a rotating diamond wheel may be topologically smooth, but often have a "milky" visual appearance, because of a fine surface roughness that depends on parameters of the grinding process including the grit size of the wheel. In either case, additional optical preparation of the edge of the glass can be performed, if required, using well-known techniques. The technique in (f) facilitates the lateral transport of optical energy associated with the secondary rays across the gap between the tiles above the image source plane, in a fashion similar to that atop pixel gaps on top of the tiles. Finally, technique (g) is required to match the front surface reflectivity of seam regions with those between the lightvalves on the tiles, primarily for improved appearance in ambient light.

View Angle Enhancement of Tiled Display

While collimation or partial collimation helps to focus primary light rays into channels passing through the lightvalves, it limits the front side viewing angles to a rather small, solid angle from the surface normal. In contrast, single-user electronic displays often are required to sustain a viewing angle distribution of ±300 and multi-user displays of up to ±700 from the surface normal. Therefore, the view angle distribution limited by collimation may be enhanced, depending on the intended application. This can be accomplished by inserting an array of lenses, or, in the current preferred design, by inserting a dispersive screen into the view plane. The lens array may consist of refractive microlenses or holographic microlenses, and it can be made using microfabrication techniques. The lens array or screen may reside on a separate transparent plate or, alternatively, it can be integrated into one of the existing glass sheets used in the tiles or the cover plate. In a 1×N preferred array the optimization of collimation in the vertical and horizontal directions is different. Accordingly the screen design is preferably made bi-directional to take full advantage of the available intensity of the light. This may be accomplished with the use of lenticular screens. The resulting view angles will be less in the vertical direction than in the horizontal and will be optimized to increase intensity along with the collimation.

Brightness Enhancement of Tiled Display

The second problem arising from collimation or partial collimation of the primary rays is that collimation tends to limit the amount of light collected by each lightvalve and consequently reduces the brightness of the display. For example, if aperture plates (masks) are used for collimation, the total light flux is reduced in proportion to the aperture ratio of the light shield facing the backlight source. Since reduced-brightness displays require low ambient light viewing conditions, the brightness may have to be enhanced. This can be done in several different ways. The intensity of the backlight source itself can be increased by boosting the electrical energy input or by using a greater number of light sources and/or reflective light concentrators. Alternatively, the efficiency for collecting the backlight into the collimated light channels can be increased by using microlens or holographic lens arrays, or other optical devices. These optical elements may also be placed between the backlight source and the image plane of the display. The first priority is to make the light intensity uniform over the entire display area. The second priority is to optimize the collimation angles and to bring the light forward.

This invention covers all techniques discussed above, and all of their combinations, for designing, constructing and assembling seamless, tiled, flat-panel displays with 16/9 format and 1×N arrays. Which of these techniques or combinations thereof are used for a given, tiled display depends on the aperture ratio, the fraction of the pixel pitch allocated for tiling functions, the assembly techniques, the specifications of the display and the viewing conditions. In order to clarify such combinations, this specific, preferred embodiment employs concepts that allow the placement of structures both in front of and behind the view plane, in order to make the seams appear invisible, under normal viewing conditions intended for the tiled display. This embodiment is useful for tiled displays having larger viewing angles and a medium-to-large view-plane-to-image-plane distance and pixel pitch ratio.

Having described the principal design factors in a vertical plane and the effect of the horizontal plane dimensions in determining critical angles for optics that are significant in creating a monolithic seamless appearance with good human factors including view angle, contrast and color shift. It is now equally important to show the design configurations in the horizontal plane which allow practical aperture ratios, pixel densities, and sealing configurations and are efficient for production of tiles in a typical AMLCD manufacturing line.

Three examples are given. In the first example, a tile design for HDTV with 16/9 ratio with 1284×720 pixels and an XGA monitor with 4/3 ratio with 1024×768 pixels are combined in one tiled display. In a second example, a HDTV 16/9 ratio with 1284×720 pixels is given. A third example with SDTV format with 852×480 pixels is also given. This FPD could also be used as a VGA monitor by activating 640×480 pixels.

Pixels and seal designs are shown for the first and third examples in FIG. 4a and FIG. 4b. In these tile designs, pixels and tile sizes are optimized to be able to fit two tiles into an AMLCD mother glass. For examples 1 and 2, the mother glass is that generally used in a Generation 3.5 manufacturing line. For case 3, the mother glass is that generally used in a Generation 3 manufacturing line.

In each example the seal design and tile perimeter designs for dam location, cell gap control and for cutting to tile specification are approximately optimized for a maximum aperture ratio while at the same time providing a narrow seal width with adequate strength for handling the tiles during the tile array assembly into an FPD.

Consider the example of a seal design (FIG. 9), drawn approximately to scale which may be used efficiently for tiles for an HDTV to be made in a generation 3.5 AMLCD manufacturing line, which typically employs glass panel sizes 720×600 mm. Two tiles containing 428×768 pixels with a pitch of 0.725 mm can be manufactured on this sized panel. Three such tiles 300 in a 1×3 configuration (FIG. 10) produce an approximately 42 inch diagonal FPD with active area resulting in an HDTV standard (1280×720 pixels). Extra available pixels in both the vertical and horizontal directions can also be used for XGA or other similar monitor resolutions. For comparison, the same pixel pitch and seal design in a slightly smaller tile, vertically, fits also within a generation 3.5 manufacturing line panel, for an HDTV with 1024×720 pixels. Both of these designs make very efficient use of the area of a generation 3.5 mother glass.

It is assumed that approximately one inch is used around the perimeter of each tile for cell gap control features 80 and for support during cutting of the mother glass into two tiles. As experience is gained, it is expected that these perimeter losses will decrease allowing increases in space for pixels and seals. Accordingly, the design features here are yet to be fully optimized.

Figure 11:
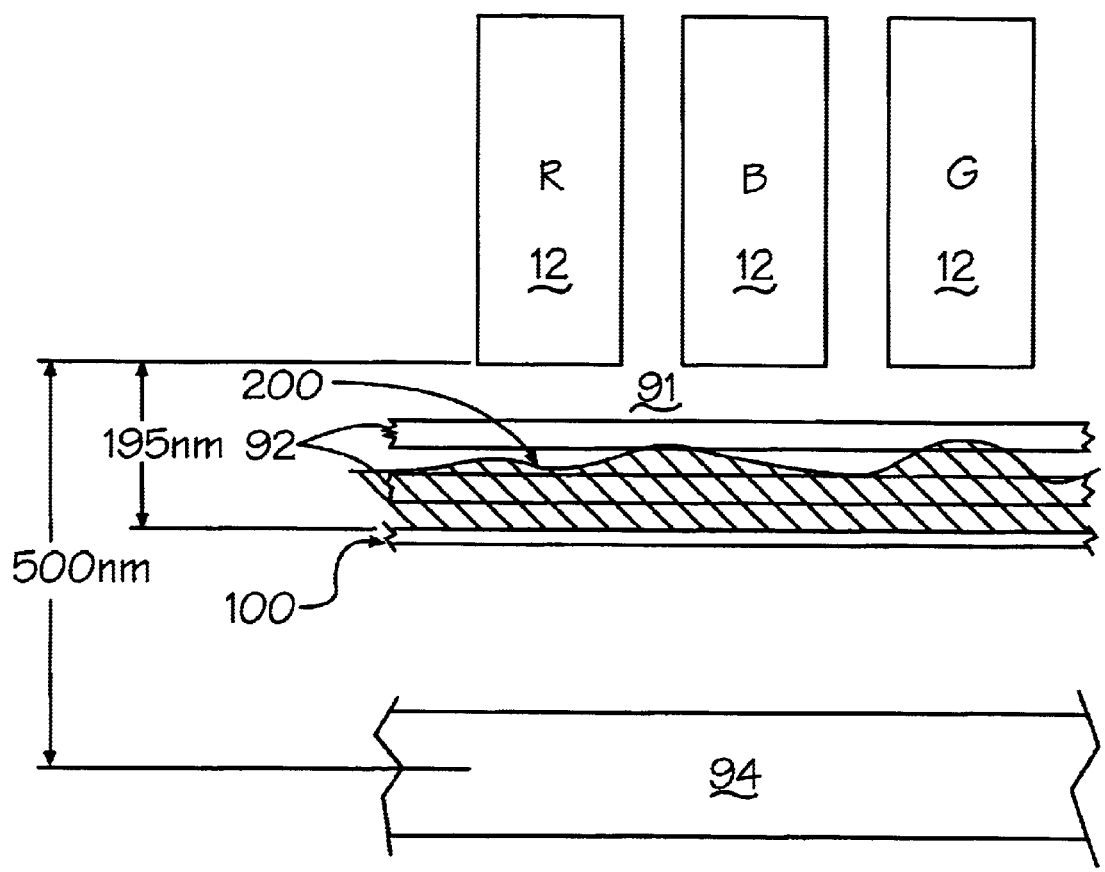
FIG. 11 depicts an approximate location of CF dams, CF dispense pad, in reference to pixels for a preferred tile design near seams for an SDTV format tiled display, also showing approximate seal location and the outer edge of a tile after cutting.

It should be understood that the inventive apparatus and/or methods are not limited to the pixel densities disclosed hereinabove, but may also be applied to panels of any range of pixel densities. For example, the SDTV design can be achieved with much more room for the seal as shown in FIG. 11 which is also drawn approximately to scale. A tile array of 3 tiles 301 with 852×480 pixels with pixel pitches of 1 mm provides a 38.5 inch diagonal FPD, 16/9 format.

Refer now also to FIG. 11. In this case the seal width, pixels to tile edge, is approximately 195 um. The average seal width is then about 100 um. As shown, the dispense pad 94 is positioned to about 500 um from the pixels which would match a seal width after squeeze (lamination) of approximately 800 um. Alternatively, a seal of width 600 um could be used which would require a dispense pad 94 to be placed approximately 400 um from the pixels and be proportionally narrower to match the wet width of the seal prior to squeeze.

Figure 13:
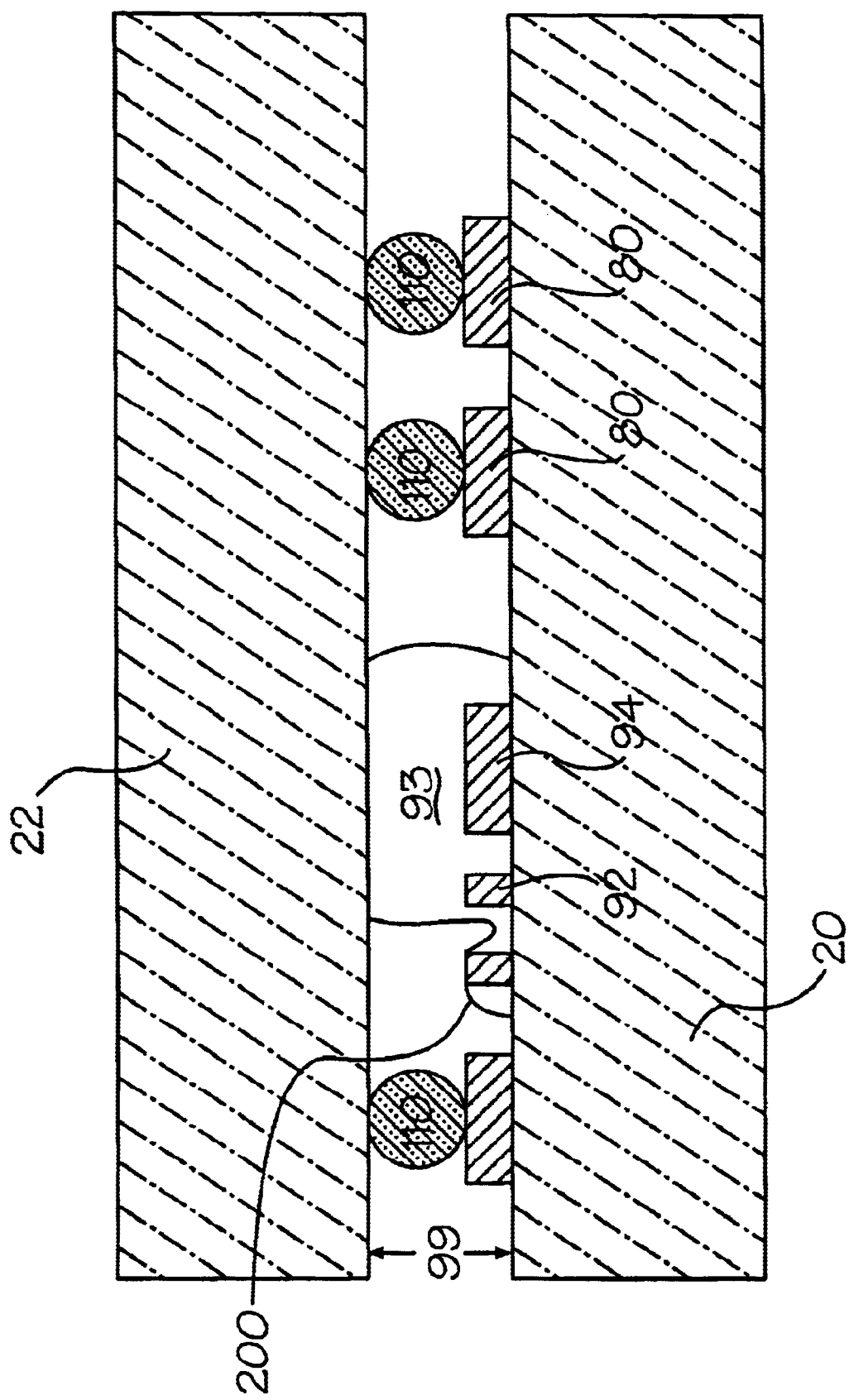

FIG. 13 shows a schematic cross section of the cell gap 99, dispense pad 94, and cell gap control CF 80 after lamination of the TFT substrate to the CF substrate.

It is anticipated that improvements in epoxies, dispensing techniques, tile size, seam fabrication techniques, and epoxy flow control structures will ultimately allow feasible pixel counts in the range of 1600×1200 for tiled flat-panel displays. Furthermore as the volume of production of flat panels increase for these HDTV and SDTV applications the mother glass will be optimized to support the most efficient production of a set of standard tile designs.

Figure 12:
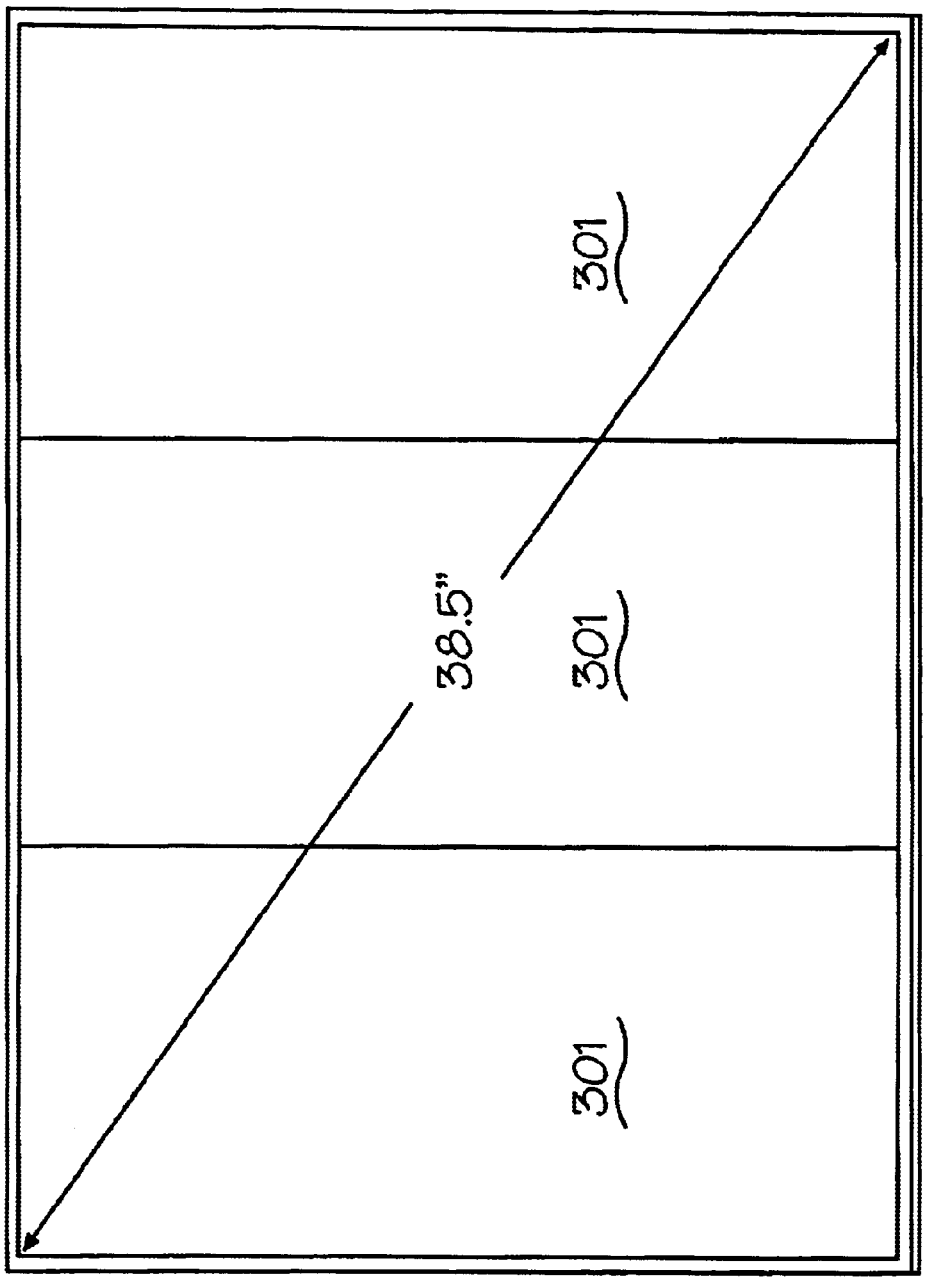
FIG. 12 shows an overall design for an FPD SDTV design with 3 tiles, each tile containing space for 284×480 pixels similar to those shown in FIG. 11.
Figure 14:
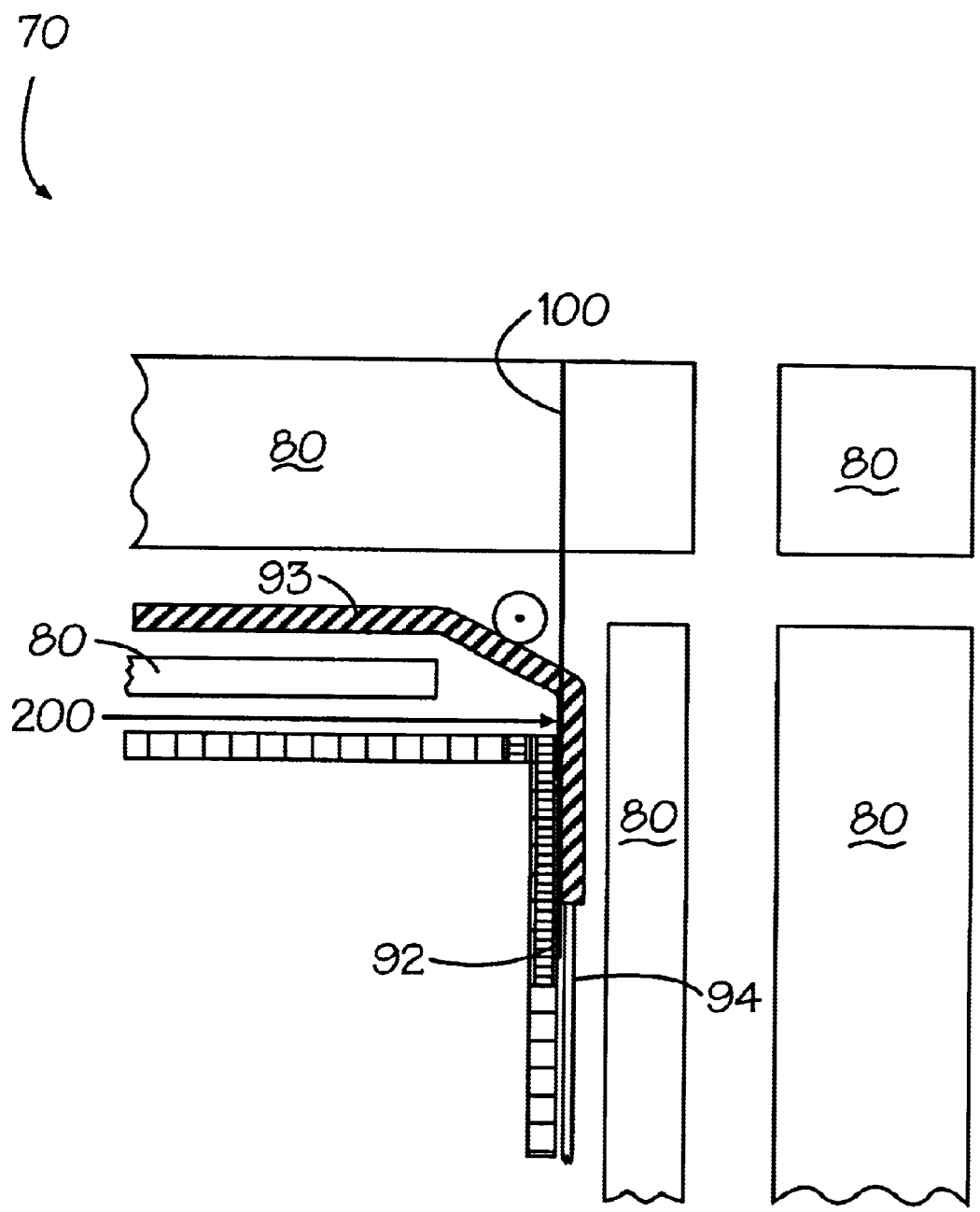
FIG. 14 is a detailed, schematic view of a seal location and profile at a corner showing the composite color filter designs for maintaining uniform cell gap, the CF dams for controlling the seal inner perimeter, the CF dispense pad for assisting in control of seal location and a fiducial dot for use in locating during assembly of the tiles.

Referring to FIG. 14, there is shown a color filter design 70 external to the pixel active areas and a seal configuration that is common for the three different tile part numbers to be used in a FPD with a 1×3 array of tiles. The rubbing direction for the polyimide, which orients the liquid crystal, and the locations of the fill ports are also common to each of the tiles. Because of these consistencies, the tile manufacturer has only one part number to produce. The actual three tile part numbers (i.e., left (300, 301), center (300, 301), and right (300, 301), shown in FIGS. 10 and 12, respectively) are determined by the cutting of the tiles. Location for the seal 93, the LC fill port 95 (FIG. 15), the dams 92, and the dispense pads 94 are shown in the plan view in FIG. 14. Note that the seal extends well beyond the pixels on the wide seal sides.

In the magnified plan view of the corner shown in FIG. 14 the seal 93 is shown as it is deposited to traverse a corner.

The cut lines here define the left side tile part number. The seal is dispensed between the CF dispense pads 94 and the CF areas 80 used, in cooperation with spacer means 110, to control cell gap.

A second factor in determining corner shape is the momentum of the dispense platform causing an overshoot. For these narrow seal designs the dispense speed may be decreased to the minimum allowed by the dispense machines. This allows the achievement of a smaller radius at the corner when necessary.

Still another factor in determining corner shape of the seal is the adhesive strength of the seal as the syringe effectively pulls the adhesive around a corner.

Figure 15:
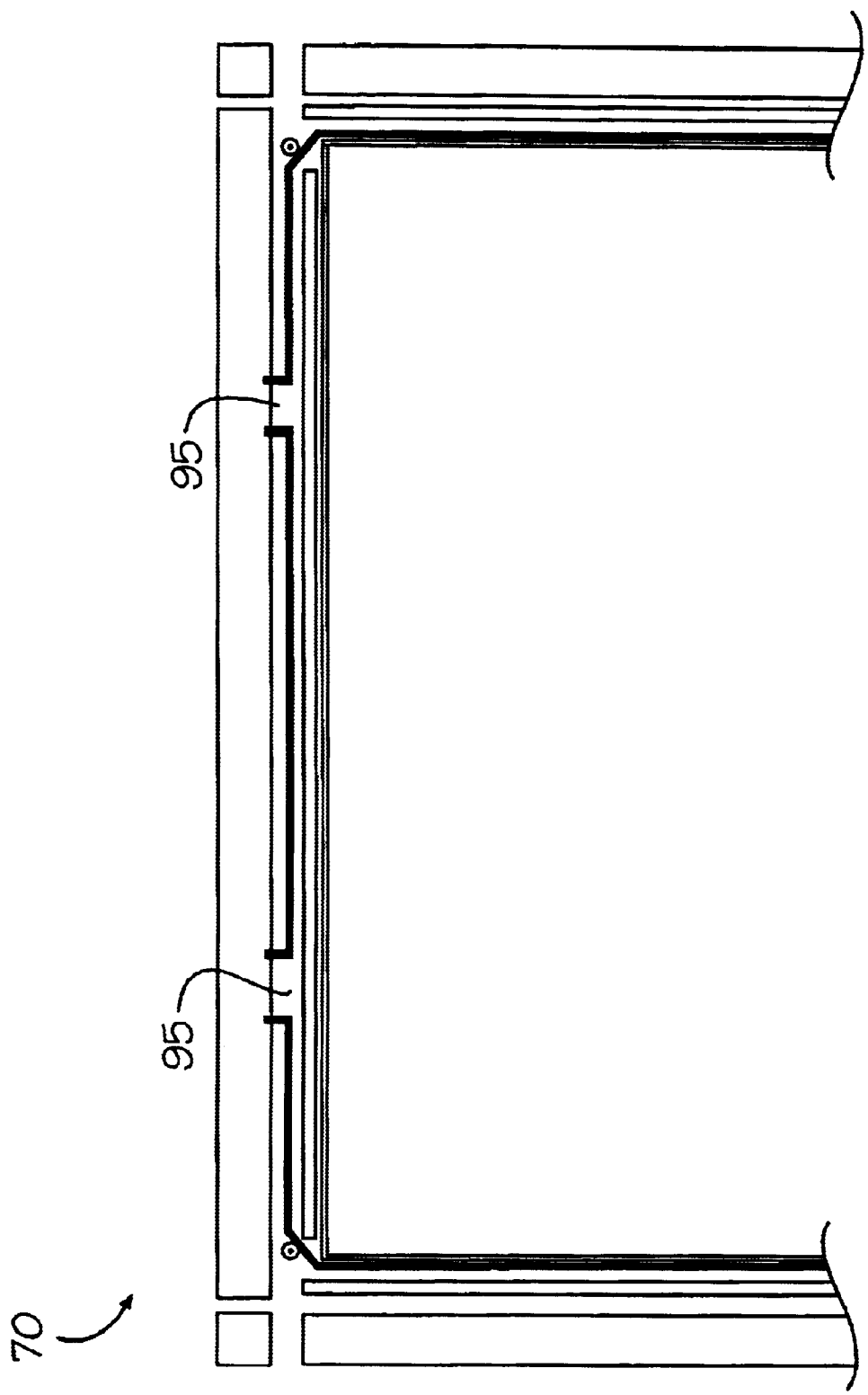
FIG. 15 is a schematic, composite view of a wide seal end of a color filter substrate (tile) showing two possible LC fill port locations and one rubbing direction allowing configuration as a single part number in a 1×3 tile array.

A single part number has been shown in FIG. 15 for the CF substrate. There are two different wiring patterns that are possible for the TFT substrate, as shown in FIG. 4. Both of these alternatives also result in a single part number. A single part number strategy is preferable for manufacturing. However it should be obvious to those skilled in the art that 3 different part numbers could be designed to meet the same FPD objectives.

Figure 10:
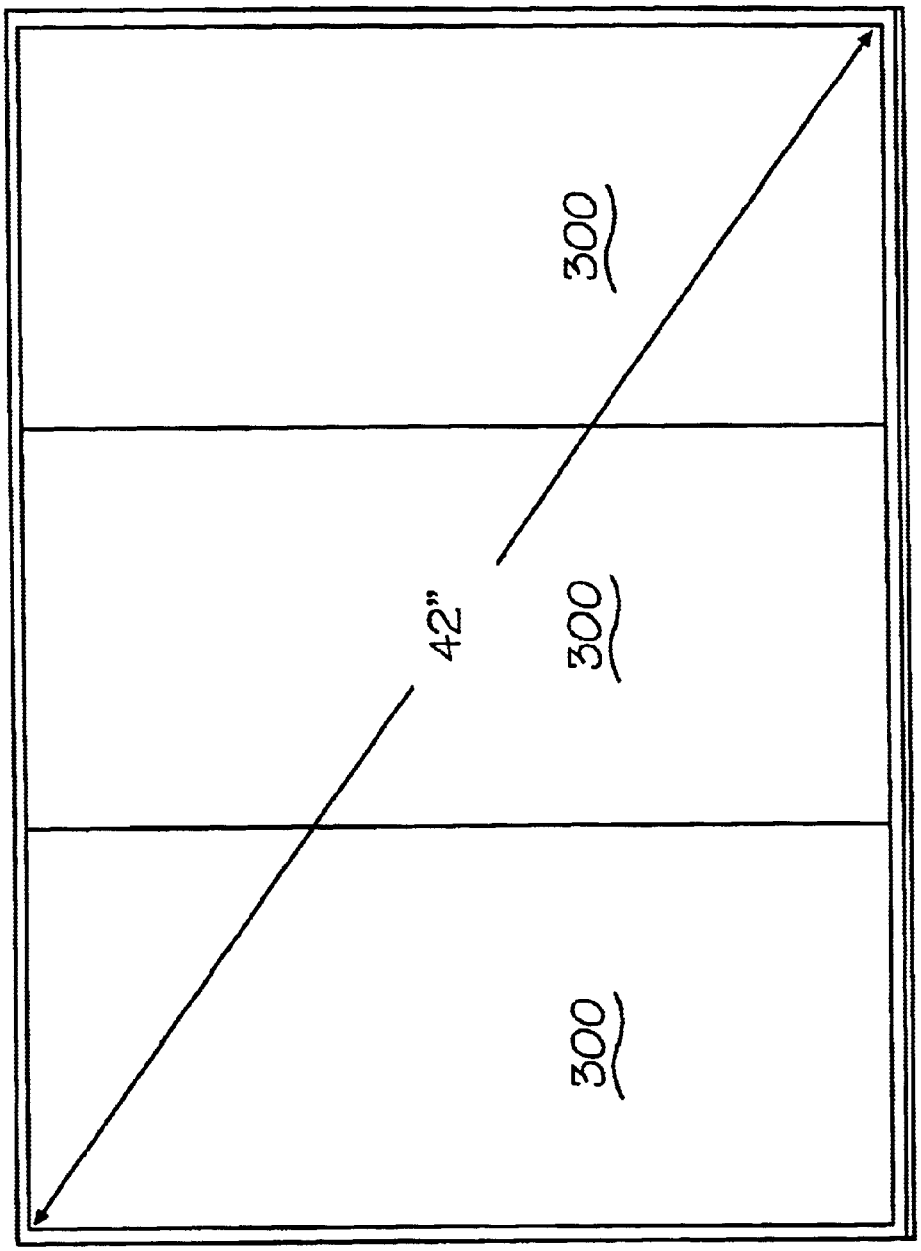
FIG. 10 shows an overall design for a FPD HDTV with 3 tiles, each tile containing enough space for 428×768 pixels similar to those shown in FIG. 9; this design has room also for 1024×768 pixels and could be used for an XGA monitor.

The CF designs outside of the seal, with the CF profile height equal to the CF height in the areas containing the pixels (FIG. 10), assist in maintaining the cell gap uniform in the area of the seam during lamination. The subject matter of FIG. 10 is more completely described in published Japanese Patent Application No. JP10-311454 (1998). The cell gap may be varied by using a choice of different sized spacer spheres 110 of glass or polymer in the seal material, as compared to those in the active area. This cell gap is maintained by the mechanical strength of the seal material even after the dummy CF is cut away during preparation of the narrow seal edge of the tile. Without a uniform cell gap across the seam, gray scale color changes may be visible in the seam area. The small differences in cell gap and TV curve response may be corrected near the seam as described in co-pending patent application Ser. No. 09/368,921, filed Aug. 6, 1999, hereby included by reference.

In the sequence of processing the TFT substrate and the CF substrate components of the tile making them ready for the assembly operation a thin film of polyimide is deposited on each substrate. As shown earlier, there is a particular rubbing direction 70 for each substrate part number. When the tiles are later assembled into an FPD, the rubbing directions 20 line up so that they are all in one direction for the TFT and in the orthogonal direction to that for the CF. A unique problem arises from these rubs at the tile level if two thirds of the tiles are rubbed from the narrow seal side while one third are rubbed from the wide seal side. Rubbing is one of the most severe generators of electrostatic discharge. In non-tiled displays, the rubbing entry point may be on the wide seal side which contains protective diodes which substantially prevent damage to the internal electronics, particularly the TFTs. Unless such preventative measures are taken for the tiles on the narrow seal sides for the TFTs, there is a risk that the ESD will create damage. Therefore, a preferred design for tiling encompasses protective diodes on the narrow seal sides as well as on the wide seal sides. A second line of defense is to add redundant TFTs for all sub pixels neighboring the narrow seal sides or preferably for all sub-pixels.

Since other combinations, modifications and changes varied to fit particular operating requirements and environments will be apparent to those skilled in the art, the invention is not considered limited to the chosen preferred embodiments for purposes of this disclosure, but covers all changes and modifications which do not constitute departures from the true spirit and scope of this invention.

Having thus described the invention, what is desired to be protected by Letters Patent is presented in the subsequently appended claims.

What is claimed is:

1. A tiled, flat-panel display having visually imperceptible seams, comprising:
    a) a plurality of display tiles in a 1×n horizontal array, each of said tiles comprising an array of pixels at a substantially uniform pixel pitch defining a viewing area, each of said pixels having a central, active area surrounded by an inactive, dark area having a predetermined width, said central, active area comprising a green, a blue and a red sub-pixel element arranged one above another along a substantially vertical axis; and
    b) vertical seam regions disposed between adjoining edges of said 1×n horizontal array of display tiles for maintaining said substantially uniform pixel pitch across said seam regions, said seam regions comprising thin, perimeter seals at adjoining edges of each of said display tiles, said thin perimeter seals having a width no greater than said predetermined width of said inactive, dark areas;
whereby corresponding sub-pixel elements at adjoining edges of two adjacent display tiles are substantially the same color.

2. The tiled, flat-panel display having visually imperceptible seams as recited in claim 1, wherein said central active areas comprise sub-pixel environments having predetermined electrical, mechanical and optical properties.

3. The tiled, flat-panel display having visually imperceptible seams as recited in claim 2, wherein said mechanical properties influence at least one of said electrical and optical properties.

4. The tiled, flat-panel display having visually imperceptible seams as recited in claim 3, wherein each of said sub-pixel environments comprises a green, a blue and a red environment proximate to and surrounding a respective one of said green, blue and red sub-pixel elements, each of said green, blue and red environments being substantially independent of one another.

5. The tiled, flat-panel display having visually imperceptible seams as recited in claim 4, wherein said green, blue and red environments each having mechanical, electrical, and optical properties, corresponding properties of said green, blue and red environments being substantially identical to one another.

6. The tiled, flat-panel display having visually imperceptible seams as recited in claim 4, wherein at least one of said green, blue, and a red environments is measurably different from at least one of the other environments.

7. The tiled, flat-panel display having visually imperceptible seams as recited in claim 1, wherein each of said sub-pixel elements has a predetermined shape.

8. The tiled, flat-panel display having visually imperceptible seams as recited in claim 7, wherein each of said predetermined shapes is provided by a display tile mask aperture having a plurality of openings, each having one of said predetermined shapes, each of said openings being located proximate one of said sub-pixel elements, and substantially centered.

9. The tiled, flat-panel display having visually imperceptible seams as recited in claim 8, wherein said mask apertures associated with a single, predetermined sub-pixel color have substantially uniform shapes and sizes.

10. The tiled, flat-panel display having visually imperceptible seams as recited in claim 9, wherein said mask apertures are substantially rectangular, the longer sides of said rectangles being arranged substantially parallel to a horizontal axis of said tiled, flat-panel display.

11. The tiled, flat-panel display having visually imperceptible seams as recited in claim 9, further comprising:
    c) means for matching luminosity and chromaticity of said plurality of display tiles operatively connected to said array of pixels.

12. The tiled, flat-panel display having visually imperceptible seams as recited in claim 11, wherein said means for matching luminosity and chromaticity is applied across a single axis of said flat panel display.

13. The tiled, flat-panel display having visually imperceptible seams as recited in claim 12, wherein said single axis of said flat panel display comprises a vertical axis.

14. The tiled, flat-panel display having visually imperceptible seams as recited in claim 9, further comprising:
    c) at least one of a cover plate display mask disposed on at least one of a front surface and a rear surface of a cover plate forming the front most element of said tiled, flat-panel display and a back plate display mask disposed on at least one of a front surface and a rear surface of a back plate forming the rearmost element of said tiled, flat-panel display.

15. The tiled, flat-panel display having visually imperceptible seams as recited in claim 14 further comprising:
    d) a screen disposed proximate a front cover plate.

16. The tiled, flat-panel display having visually imperceptible seams as recited in claim 14, wherein said 1×n horizontal array of display tiles comprises an aspect ratio of at least one from the group of 16:9, and 4:3.

17. The tiled, flat-panel display having visually imperceptible seams as recited in claim 14, wherein said 1×n horizontal array of display tiles comprises an array of at least one from the group of approximately 1280×720, 1284×720, 1284×786, 1024×768, 852×480 and 684×480 pixels.

18. The tiled, flat-panel display having visually imperceptible seams as recited in claim 17, wherein said display is formed from three tiles each having approximately 428×768 pixels arranged in a 1×3 configuration, and being adapted to interchangeably operate at more than one of said group of approximately 1280×720, 1024×768, 852×480 and 640×480 pixels by utilizing, as required, unused pixels in at least one of a horizontal and a vertical direction.

19. The tiled, flat-panel display having visually imperceptible seams as recited in claim 14, further comprising:
    d) wiring means for interconnecting said sub-pixel elements to drive signals.

20. The tiled, flat-panel display having visually imperceptible seams as recited in claim 19, wherein said vertical seam regions comprises a dispense pad acting cooperatively with at least one dam structure for directing flowable seal material along said vertical seams and substantially preventing encroachment of said flowable seal material into said central, active areas of said pixels.

21. The tiled, flat-panel display having visually imperceptible seams as recited in claim 19, further comprising:
    e) light collimating means disposed adjacent a back surface e of said tiled, flat-panel display and intermediate sa id back surface and an external light source for controlling the divergence of light entering said back surface of said tiled, flat-panel display such that said entering light is substantially prevented from entering said vertical seam regions.

22. The tiled, flat-panel display having visually imperceptible seams as recited in claim 21, wherein said light collimating means comprises a back plate mask.

* * * * *